US007712095B2

(12) United States Patent
Toyota et al.

(10) Patent No.: US 7,712,095 B2
(45) Date of Patent: May 4, 2010

(54) REMOTE CONTROL SERVER, CENTER SERVER, AND SYSTEM CONSTITUTED THEM

(75) Inventors: Masashi Toyota, Kagawa (JP); Toru Imai, Kagawa (JP); Shunji Kurokawa, Kagawa (JP); Sadayuki Matsumoto, Kagawa (JP); Yoshikazu Nakanishi, Takamatsu (JP); Koji Ohno, Takamatsu (JP); Ryoichiro Higashihara, Takamatsu (JP); Kenji Ozaki, Takamatsu (JP)

(73) Assignees: Shikoku Electric Power Co., Inc., Takamatsu-shi (JP); Shikoku Instrumentation Co., Ltd., Nakatado-gun (JP)

( * ) Notice: Subject to any disclaimer, the term of this patent is extended or adjusted under 35 U.S.C. 154(b) by 1486 days.

(21) Appl. No.: 10/344,692

(22) PCT Filed: Aug. 24, 2001

(86) PCT No.: PCT/JP01/07276

§ 371 (c)(1),
(2), (4) Date: Sep. 11, 2003

(87) PCT Pub. No.: WO02/17087

PCT Pub. Date: Feb. 28, 2002

(65) Prior Publication Data

US 2004/0049524 A1 Mar. 11, 2004

(30) Foreign Application Priority Data

Aug. 25, 2000 (JP) ............................. 2000-256421

(51) Int. Cl.
*G06F 9/455* (2006.01)

(52) U.S. Cl. ........................................................ 718/1

(58) Field of Classification Search .................... 718/1, 718/100; 709/202; 701/36
See application file for complete search history.

(56) References Cited

U.S. PATENT DOCUMENTS 7,065,549 B2 *   6/2006   Sun et al. ..................... 709/201

OTHER PUBLICATIONS

Staber et al., Mole—A Java Based Mobile Agent System, IPVR (Institute for Parallel and Distributed Computer Systems), University of Stuttgart, Oct. 23, 1996.*
Koji Sakai, "Technology Finder; Consent kara Kaden Seigyo suru Shikoku Denryoku no Open Planet", Nikkei Multimedia, Apr. 1998, No. 33, pp. 70-75./Cited in the International Search Report.

(Continued)

*Primary Examiner*—Thomas Lee
*Assistant Examiner*—Eric C Wai
(74) *Attorney, Agent, or Firm*—Westerman, Hattori, Daniels & Adrian, LLP

(57) ABSTRACT

A system for autonomous decentralized control in which a client terminal and a center server are connected, as a network through a WAN and/or LAN, to a remote control server connected to a monitored/-controlled target device through a control communication network. The system is characterized in that a virtual machine, which is described as the other self of the monitored/controlled target device having the same information as that possessed by the monitored/controlled target device, and which is a software object having communication protocols used for communication with the monitored/controlled target device and concealed in the software object, is moved in the system with transparency and/or is held in the client terminal, the center server, or the remote control server.

9 Claims, 11 Drawing Sheets

OTHER PUBLICATIONS

Hiroki Yomogida, "Kaden to PC wo tsunagu Dai 3bu Denryoku Meter ga 'Gate Way' ni Henbou suru", Nikkei Electronics, May 1999, No. 743, pp. 121-126./Cited in the International Search Report.

Tsutomu Itokazu et al., "Furyoku Taiyou Hikari Hybrid Hatsuden System no Enkaku Kanshi Bunsan Seigyo e no Lon Works no Tekiyou", Denshi Joho Tsuushin Gakkai Gijutsu Kenkyuu Houkoku, CPSY99-38, May 1999, pp. 7-11./Cited in the International Search Report.

Office Action issued in Japanese Application No. 2001-256582 dated Jun. 27, 2008.

T. Kawabata, et al., The Use of XML in Component Oriented OpS, NTT Optical Network Systems Laboratories, Institute of Electronics, Information and Communication Engineers, pp. 25-30, Jan. 1999.

Shinichi Honiden, Mobile Agents Technology—Software Technology for Network Computing, pp. 228-233, Sep. 15, 1998.

* cited by examiner

Fig.4

Vm Management Table 130

| Chip ID | Index No. | Vm Class No. | Vm IF Class No. | Liveflag |
|---|---|---|---|---|
| 1001 | 100111111 | Vm1001 | VmIF1001 | Active |
| 1002 | 100211111 | Vm1002 | VmIF1002 | NonActive |
| 1003 | 100311111 | Vm1003 | VmIF1003 | Active |
| 1004 | 100411111 | Vm1004 | VmIF1004 | NonActive |
| . | . | . | . | . |
| . | . | . | . | . |
| . | . | . | . | . |

# REMOTE CONTROL SERVER, CENTER SERVER, AND SYSTEM CONSTITUTED THEM

TECHNICAL FIELD

The present invention relates to a server, more particularly a remote control server and a center server, for monitoring/controlling a target device under a network environment. Also, the present invention relates to a system constructed of those servers.

BACKGROUND ART

Hitherto, to monitor and control various industrial devices, apparatuses, etc. located in a plurality of remote positions and to collect data measured using various measuring instruments, including electronic meters, it has been required to issue commands from a monitoring/-control center or a data collection center to instruct an industrial personal computer or general computer, which functions as a server computer installed in each site and operates in accordance with programs described in a special assembly language or the C language, to collect monitored/controlled data and to execute a control program for control of the controlled target device, etc., and to transmit the result of device operation, the monitored measurement data, etc. to the monitoring/-control center through radio wirelessly or via public telephone lines or dedicated lines.

In such a case, the monitoring/control center has issued commands to or has received data, etc. from the personal computers or the general computers, or the various measuring instruments installed in the plurality of remote positions through individual communications using radio or telephone connection each time an occasion requires.

Therefore, a system must have been constructed by resorting to specialized makers, expert persons, etc., who are well skilled in communication protocols and control programs, and software such as dedicated programs must have been developed. Those situations have resulted in a higher system price, a lower transmission rate of commands, data, etc., and an increased communication cost.

DISCLOSURE OF THE INVENTION

An object of the present invention is to provide a server, more particularly a remote control server and a center server for monitoring/controlling a target device under a network environment.

Another object of the present invention is to provide a system for autonomous decentralized control, in which the center server is connected to the remote control server.

More specifically, an object of the present invention is to provide a server, more particularly a remote control server and a center server, which can perform monitoring/control of the operation, collect data, and transmit/receive related information when connected to various devices or apparatuses in use, which can easily construct a system such as for highly versatile remote monitoring/control utilizing the Internet, or for emergency communication utilizing cellular phones, radio pagers, etc. and which can more simply and flexibly construct a system at a lower cost than conventional dedicated monitoring/control systems, as well as to provide a system constructed of those servers.

The present invention resides in a system for autonomous decentralized control in which a client terminal and a center server are connected, as a network through a WAN and/or LAN, to a remote control server connected to a monitored/controlled target device through a control communication network, the system being characterized in that a virtual machine, which is described as the other self of the monitored/-controlled target device having the same information as that possessed by the monitored/controlled target device, and which is a software object having communication protocols used for communication with the monitored/controlled target device and concealed in the software object, is moved in the system with transparency and/or is held in the client terminal, the center server, or the remote control server.

The above expression "moved in the system with transparency" means that the virtual machine is able to seamlessly move between the information communication network and the control communication network through rewriting of status information and control information of each device into a software object (data structure having both a value and proceedings for reading/writing the value) because the virtual machine contains a plurality of communication protocols therein.

The server, in particular the remote control server, is able to change information of the monitored/controlled target device and/or to monitor and control the target device by operating the virtual machine. In this case, the present invention resides in a system which can create, hold and/or operate a virtual machine being a software object described as the other self of a monitored/controlled target device having the same information as that possessed by the monitored/controlled target device and containing a plurality of communication protocols used for communication with the monitored/controlled target device and concealed in the software object, and/or which can distribute the virtual machine and can call, hold and/or operate a virtual machine created by another server, and/or which can change information of the monitored/-controlled target device and/or control the target device by operating the virtual machine.

Further, the server, in particular the remote control server, has functions capable of creating, holding and/or operating an inclusive virtual machine including setting of a plurality of virtual machines and/or a fixed agent describing functions such as behaviors of each of the virtual machines, and/or including even records acquired through each of the virtual machines, and a supervising virtual machine for supervising a plurality of inclusive virtual machines, and/or distributing the created inclusive and supervising virtual machines, and/or calling, holding and/or operating an inclusive virtual machine and a supervising virtual machine created by another remote control server. Preferably, the server can change information of each of the plurality of the monitored/controlled target devices and/or monitor and control each target device by operating the inclusive virtual machines and/or the supervising virtual machines. In this case, the present invention resides in a system which can call, hold and/or operate a virtual machine being a software object described as the other self of a monitored/controlled target device having the same information as that possessed by the monitored/controlled target device and containing a plurality of communication protocols used for communication with the monitored/controlled target device and concealed in the software object, and/or which can distribute the virtual machine, and/or which can call, hold and/or operate a virtual machine created by another remote control server, the server further having functions capable of creating, holding and/or operating an inclusive virtual machine including setting of a plurality of virtual machines and/or a fixed agent describing functions such as behaviors of each of the virtual machines, and/or including even records acquired through each of the virtual machines, and a supervising virtual machine for supervising a plurality of inclusive virtual machines, and/or distributing the created inclusive and supervising virtual machines, and calling, holding and/or operating an inclusive virtual machine and a supervising virtual machine created by another remote control server. In addition, preferably, the server can change information of each of the plurality of the monitored/controlled target devices and/or monitor and control each target device by operating the inclusive virtual machines and/or the supervising virtual machines.

Moreover, the present invention resides in a system including a center server connected to a communication/information network and managing one or more remote control servers and a system in which monitored/controlled target devices are all connected as a network, wherein the center server can create, hold and/or operate a virtual machine being a software object described as the other self of each monitored/controlled target device having the same information as that possessed by the monitored/controlled target device and containing a plurality of communication protocols used for communication with the monitored/controlled target device and concealed in the software object, and can distribute, to one or more remote control servers, an agent describing behaviors, etc. of the virtual machine and/or the remote control servers, the center server further having functions capable of creating, holding and/or operating an inclusive virtual machine including a plurality of virtual machines, and/or a fixed agent describing functions such as behaviors of each of the virtual machines, and/or even records acquired through each of the virtual machines, and a supervising virtual machine for supervising a plurality of inclusive virtual machines, and/or distributing the created inclusive and supervising virtual machines, and/or calling, holding and/or operating virtual machines, inclusive virtual machines and supervising virtual machines created by the remote control servers. In addition, the center server can change information of each of the plurality of the monitored/controlled target devices and/or can monitor and control each target device by sharing information in common with the monitored/controlled target devices, operating the virtual machines, the inclusive virtual machines and the supervising virtual machines, and/or by operating the agent. Through the operations described above, the center server performs management/processing of collected data and management of the system.

BRIEF DESCRIPTION OF THE DRAWINGS

FIG. 4 is an explanatory view of a Vm management table 130 for the monitored/controlled target devices (the table containing not only Vm class numbers of the monitored/controlled target devices for remotely controlling each monitored/controlled target device, but also interface numbers corresponding to the Vm class numbers of the monitored/controlled target devices), which is possessed by the OP server.

BEST MODE FOR CARRYING OUT THE INVENTION

Figure 1:
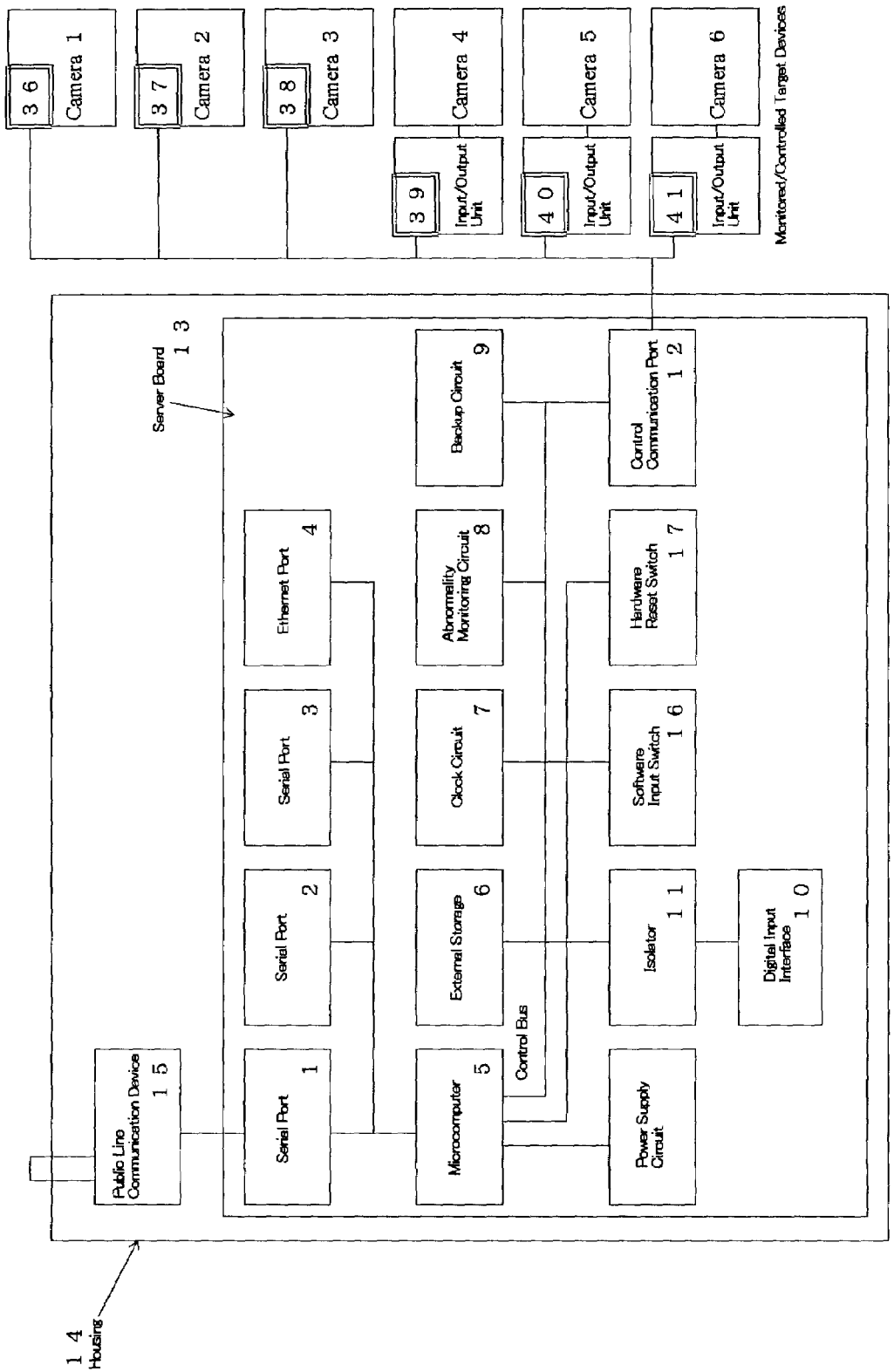
FIG. 1 is a schematic block diagram of hardware of a server.

The above-mentioned server of the present invention includes a wireless communication device as standard, and it can also be provided with an external communication device giving a serial communication function when a communication standard is switched over from the wireless communication device to RS232C installed in the server.

The above-mentioned server of the present invention includes a control communication port capable of, as an occasion requires, communicating with and supplying power to the monitored/controlled target devices and an input/output unit, etc. in which a microcomputer, serving as a control communication LSI, or a control communication module is installed. Also, the server includes an Ethernet port for communication using Internet protocols via a wide area network with LAN (Local Area Network) and WAN (Wide Area Network) devices.

The above-mentioned server of the present invention includes, as an occasion requires, a digital input interface that is used for the monitored/controlled target devices and is electrically isolated from an internal system.

Also, the above-mentioned server of the present invention includes a serial port to which a console unit for function setting and maintenance of the system can be connected.

Further, it is possible to protect data in a memory area in the event of power-down with a backup battery, to record the date and time of the power-down, and to restore to the state before the power-down at the time of recovery.

The above-mentioned server of the present invention is able to, as an occasion requires, externally operate a software input switch and a hardware reset switch, which provide respective timing inputs for starting software installation and maintenance to an external storage.

Moreover, the above-mentioned server of the present invention includes a real-time operating system and a Java run environment as standard, and has programs for providing a client server function, an agent server function and an HTTP server function.

The above-mentioned server of the present invention has, as standard, a PPT (Point to Point Protocol) connection function capable of performing data exchange and bi-directional call via public lines for the purpose of facilitating, e.g., installation of the server in a place where laying-down of cables is infeasible, and connection from a mobile medium, as an occasion requires, and also has the function of directly controlling the PPP connection from Java applications and executing an emergency call such as an abnormality notice.

The above-mentioned server of the present invention has the FTP function and the TELNET function, as an occasion requires, for transfer of files and data to and from a client terminal, a center server and/or an external system. Also, the server has an environment for executing and managing Java applications under a network environment, and is able to process digital inputs with the Java applications.

The above-mentioned server of the present invention has the function capable of recording, as an occasion requires, an abnormal condition discovered by a self-diagnosis function and operating and abnormal conditions of the monitored/controlled target devices and a control communication network, as log messages, in a nonvolatile memory inside the system with a system log management function, and the function capable of transmitting, as E-mails, an alarm message, etc. to preset places and persons.

The above-mentioned server of the present invention includes a remote station system for, as an occasion requires, causing a fixed agent to be distributed or to reside, and has monitoring function capable of performing information collection from and monitoring/control of the monitored/controlled target devices, which are connected to the outside, using virtual machines, and capable of executing processing, computations, etc. of the collected information. Stated otherwise, in a preferable form, the server of the present invention can create, hold and/or operate a virtual machine, which is a software object described as the other self of each monitored/controlled target device having the same information as that possessed by the monitored/controlled target device and contains a plurality of communication protocols used for communication with the monitored/controlled target device and concealed in the software object, and/or can distribute the created virtual machine, the server further having functions capable of creating, holding and/or operating an inclusive virtual machine including setting of a plurality of virtual machines and/or a fixed agent describing functions such as behaviors of each of the virtual machines, and/or including even records acquired through each of the virtual machines, and a supervising virtual machine for supervising a plurality of inclusive virtual machines. In addition, the server can change information of each of the plurality of the monitored/controlled target devices and/or monitor and control each target device by operating the virtual machines, the inclusive virtual machines and the supervising virtual machine, and/or it includes a remote station system for causing the fixed agent to be distributed or to reside, and has monitoring functions capable of performing information collection from and monitoring/control of the monitored/controlled target devices, which are connected to the outside, using the virtual machines, and capable of executing processing, computations, etc. of the collected information.

The above-mentioned server of the present invention includes a scheduled operation run managing function and a device linkage control function capable of, as an occasion requires, collecting/storing information and current values of the monitored/controlled target devices in accordance with a schedule registered beforehand, storing records of status changes of designated information, creating trend records of analog values at designated cycles, daily reports, monthly reports, etc., and displaying the current values through the virtual machines and browsing the stored data via the network.

A preferred embodiment of the present invention will be described below with reference to the drawings.

Figure 2:
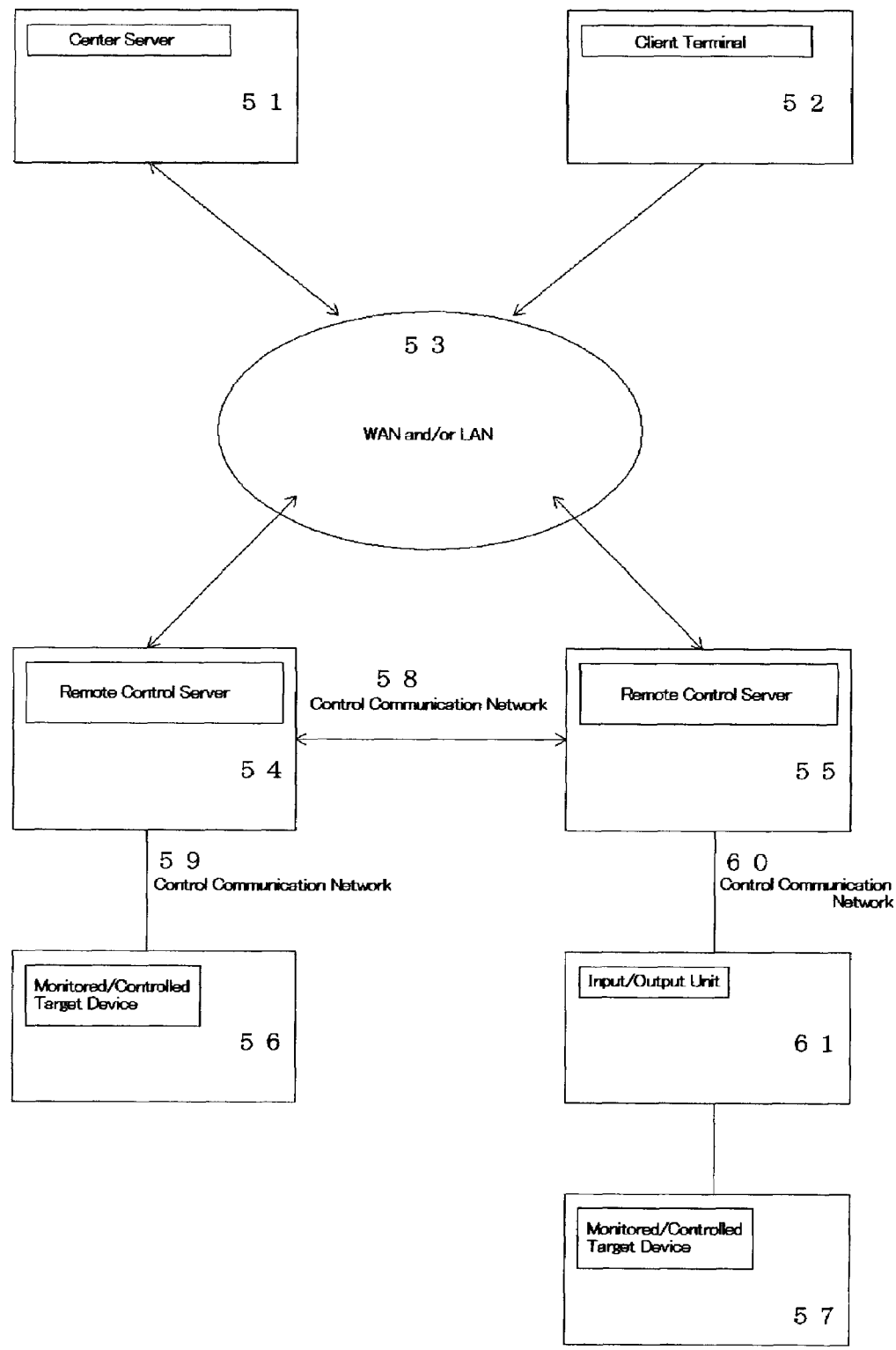
FIG. 2 is a system configuration diagram showing a linkage of the server with a client terminal and a monitored/controlled target device when the server is positioned as a remote control server relative to a center server.

FIG. 1 is a schematic block diagram of hardware of a server, and FIG. 2 is a system configuration diagram showing, by way of example, a linkage of the server with a client terminal and a monitored/controlled target device when the server is positioned as a remote control server relative to a center server.

The server of the present invention includes, as shown in FIG. 1, three serial ports 1, 2 and 3, an Ethernet (trade name registered by XEROX in U.S.A.) port 4, a microcomputer 5, an external storage 6, a clock circuit 7, an abnormality monitoring circuit 8, a backup circuit 9, a digital input interface 10, an isolator 11, a control communication port 12, a server board 13 on which the above-mentioned components are mounted, a housing 14 in which the above-mentioned components are housed, a public line communication device 15 such as PHS (Personal Handy-phone System) or cellular phone modem, a software input switch 16, and a hardware reset switch 17.

The serial port 1 is a port for connection of the public line communication device 15. For example, a mobile communication modem can be attached to the housing 14, and the public line communication device 15 can be connected to the outside when the communication standard is switched over to RS232C. The serial port 2 is a serial port for performing communication based on one of TR232C and RS422, which are generally installed as communication standards and switched over from one to the other.

The serial port 3 is a serial port dedicated for connection of a console unit used for maintenance, input of software, etc.

The Ethernet port 4 serves as an interface of 10 BaseT for communication with the outside in accordance with the TCP/IP protocol, for example.

The microcomputer 5 is a central processing unit for executing and controlling systems, such as a real-time operating system and a Java run environment, and applications. The external storage 6 is constituted as, e.g., a nonvolatile memory, and stores necessary data and programs. In the event of power-down, the data in the external storage can be protected with the backup circuit 9.

The clock circuit 7 operates independently of the microcomputer 5 to provide time data and to realize an interrupt timer and a constant-period timer which are necessary for the system's internal operations.

The digital input interface 10 is used to directly take in information of the monitored/controlled target devices, etc. The information is taken in through the isolator 11 that provide electrical isolation with respect to the internal system such as the microcomputer 5.

The control communication port 12 is a port for communication with the monitored/controlled target devices using, e.g., LONWORKS (trade name registered by ECHELON in U.S.A.).

The housing 14 serves to protect the server board 12 and has a compact shape so as not to undergo limitations on, e.g., a place where the server is installed.

Next, FIG. 2 is a system configuration diagram showing, by way of example, a linkage of the server with a client terminal 52 and a monitored/controlled target device when the server is positioned as a remote control server relative to a center server 51. The center server and the client terminal are connected to one or more remote control servers (two remote control servers 54, 55 in an example of FIG. 2) via a WAN and/or LAN 53. Each of the remote control servers is connected to the monitored/controlled target device directly from the control communication network when the monitored/controlled target device has the control communication function, and through an input/output unit having the control communication function when it has not the control communication function.

FIG. 2 shows the example in which the remote control server 54 is directly connected to a monitored/controlled target device 56 from a control communication network 59, and the remote control server 55 is connected to a monitored/controlled target device 57 through an input/output unit 61 from a control communication network 60.

<<Monitored/Controlled Target Device Side>>

The monitored/controlled target device is connected to the control communication network. The connection is realized in the form in which a microcomputer, serving as a control communication LSI, or a control communication module is installed in the monitored/controlled target device, or in the form in which the monitored/controlled target device is connected to an input/output unit including a microcomputer, serving as a control communication LSI, or a control communication module therein.

<<Control Communication Module on Monitored/Controlled Target Device Side>>

The monitored/controlled target device connected to the control communication network is required to include a microcomputer (e.g., a LON chip made by ECHELON), serving as a control communication LSI, or a control communication module therein, and/or it requires to be connected to an input/output unit in which a microcomputer, serving as a control communication LSI, or a control communication module is installed (hereinafter sometimes referred to simply as an "input/output unit").

The term "monitored/controlled target device" used in the following description also sometimes means a device that includes a microcomputer (e.g., a LON chip made by ECHELON), serving as a control communication LSI, or a control communication module therein, and/or a device connected to an input/output unit in which a microcomputer, serving as a control communication LSI, or a control communication module is installed.

Programs for the microcomputer is described using the C language (neuron C language in the LON chip made by ECHELON) that is communicable with the Java language (Java: trade mark registered by Sun Microsystems in U.S.A.).

Also, the microcomputer contains a control program with which the microcomputer can control the monitored/controlled target device, and a control communication program having protocols with which the microcomputer can perform data communication with the server via the control communication network.

The program installed in the microcomputer for communication with the control communication network usually has, device management information, the chip ID of the monitored/controlled target device, the index number indicating the installation position, etc., the Vm class number (virtual machine class number), and the Vm interface class number (virtual machine interface class number). For permitting control from the outside, the program also has status information that can be made open to the outside, and operational information allowing operation from the outside. Hereinafter, the virtual machine is abbreviated to Vm. The device management information, the status information and the operational information are in the form of network variables that can be referred to via the WAN and/or the LAN, etc. A Vm class file is software for operating the monitored/controlled target device, and a Vm interface class file is interface software for establishing connection to the monitored/controlled target device in combination with the Vm class file.

For example, when the monitored/controlled target device is a monitoring camera, there are machine information such as the chip ID, the Vm class number, the maker and the model, control information such as on/off information of the camera, brightness of illumination, direction control, zoom control and sound recording, and status information representing the current control status.

Those network variables differ depending on the type of the monitored/controlled target device and are set on the maker side, while the index number indicating the installation position, etc. can be set on the user side.

<<Client Server Program>>

A client server program stored in the external storage of the server will now be described below.

To explain briefly, the server of the present invention is connected to the monitored/controlled target device capable of performing communication directly or through input/output unit with respect to the control communication network, and contains a server program having a gateway function for connection between the associated control communication network and the control communication network to which the client machine and the center server can be connected via the WAN and/or the LAN.

The server program acquires the chip ID and the index number (specific information) for identifying the monitored/controlled target device, the status information, and the operational information when the monitored/controlled target device is connected to the server from the control communication network directly in the case of the target device having the information communication function or through the input/output unit connected to the control communication network in the case of the target device not having the information communication function. Also, the server program has an interface class (interface class software) for providing, to the client machine (hereinafter sometimes referred to simply as a "client") and the center server (hereinafter sometimes referred to simply as a "center"), a Vm class (monitored/controlled target device operating software) that refers to and operates the status information and the operational information of the monitored/controlled target device, and for establishing the connection to the monitored/controlled target device on the server side in combination with the Vm class, when the client or the center accesses the server via the WAN and/or the LAN, etc.

The client server program contains an operating system program (OS) that can be processed to control hardware in the server and corresponds to multitasking and multithreading. This OS is, e.g., ITRON, Vx-WORKS, etc.

The operating system contains various driver programs such as public line communication drivers for wireless and wired phones, transceivers, etc., a control communication driver, a file system and a clock driver, and an API (Application Programming Interface) for making those drive programs correspond to application programs.

Also, the operating system contains a remote operating system program described in a distributed object oriented language (e.g., a platform-free language such as Java).

<<Remote Operating System Program>>

The system program in the server comprises a control program for controlling the server itself, an agent server program for transmitting and receiving an agent, a communication program in the form of a browser for performing network communication in accordance with TCP/IP or PPP using wireless and wired phones, transceivers, etc., and a server program 100 that fulfills a gateway function of connecting the external WAN and/or the LAN to the control communication network.

The gateway function differs from a gateway for connecting the so-called information networks in point of seamlessly connecting the information communication network and the control communication network to each other, and enables an arbitrary terminal computer in an external network, such as the Internet, to access the server for browsing and operating the monitored/controlled target device communicated with the server via the control communication network.

<<Server Program>>

Figure 3:
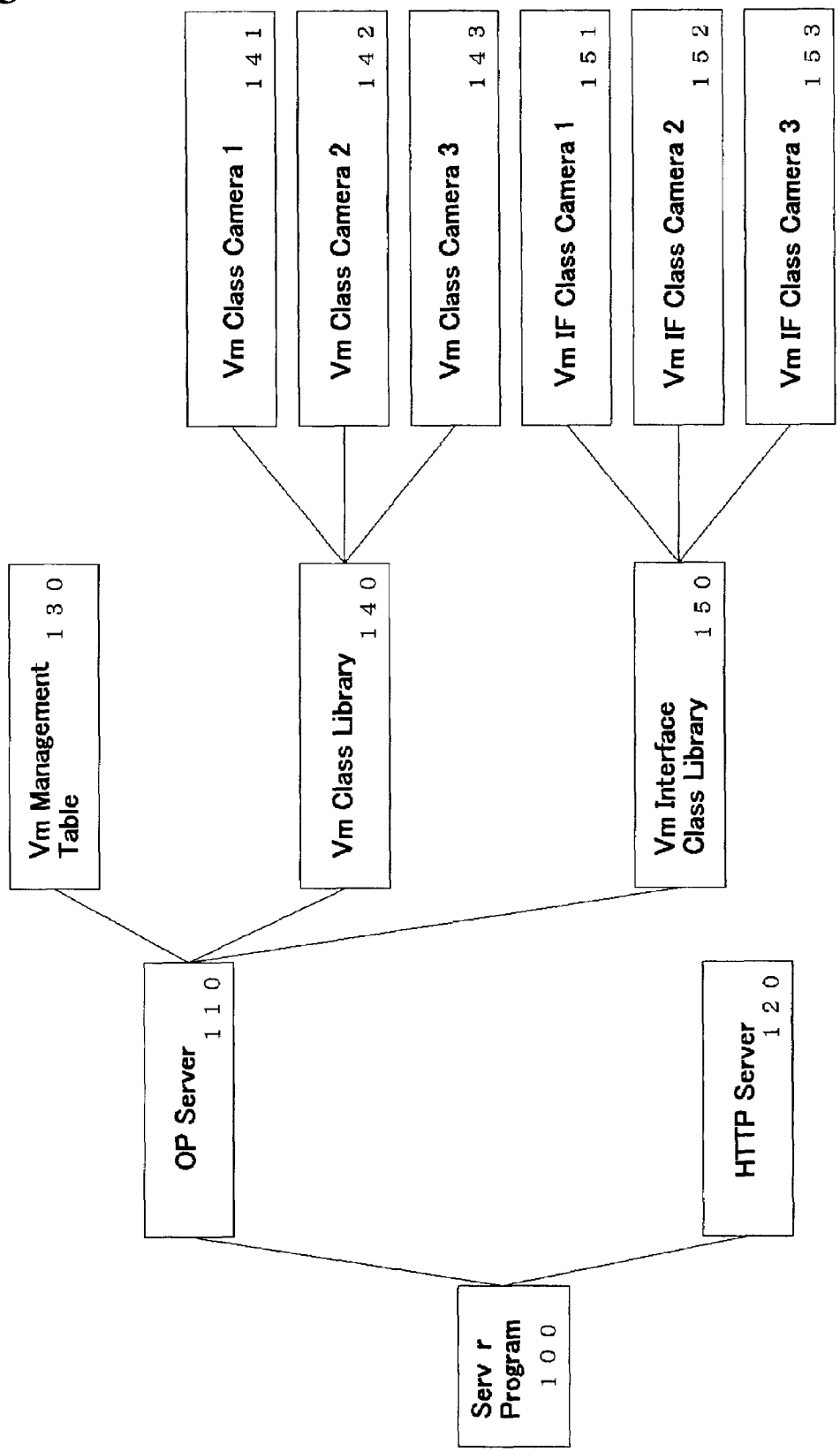
FIG. 3 is an explanatory view of a server program 100 containing an OP server 110 for managing a Vm class file as an operational program that provides information to a client or center side information terminal (client machine and center server), and an HTTP server 120 for distributing a Vm class of the monitored/controlled target device to the client or center side.

To describe with reference to FIG. 3, the server program 100 comprises an OP server 110 for managing the Vm class file (hereinafter abbreviated to a "Vm class"), which is an operating program for providing information to an information terminal (client machine or center server) on the client or center side, and an HTTP server 120 for distributing the Vm class of the monitored/controlled target device on the client or center side.

The OP server 110 comprises a Vm management table 130 for the monitored/controlled target device, a Vm class library 140 for the monitored/controlled target device, and a Vm interface class library 150 for control communication of the monitored/controlled target device.

The OP server 110 contains a monitored/controlled target device detecting program for detecting, from a new monitored/controlled target device connected to the control communication network, the device information outputted from the target device itself or through in input/output unit having a communication function built therein, and registering the detected device information in the Vm management table 130 for the monitored/controlled target device.

In the case of a monitoring camera Camera1, for example, the monitored/controlled target device information includes the chip ID, the index number and the Vm class number, as shown in FIG. 4. Those items of information are used to designate the monitored/controlled target device on the control communication network.

The Vm management table 130 collects and records therein not only the Vm class number of the monitored/controlled target device for remote control of each monitored/controlled target device, but also the interface number corresponding to the Vm class number of the monitored/controlled target device. With the Vm class number and the interface class number correlated with each other in the Vm management table 130, the Vm class and the interface class of the interface class number corresponding to the Vm class can be called in a combined state by designating the Vm class number.

The Vm class library 140 collects and records therein the Vm class numbers and Vm classes 141-143 . . . designated by the respective Vm class numbers.

Figure 5:
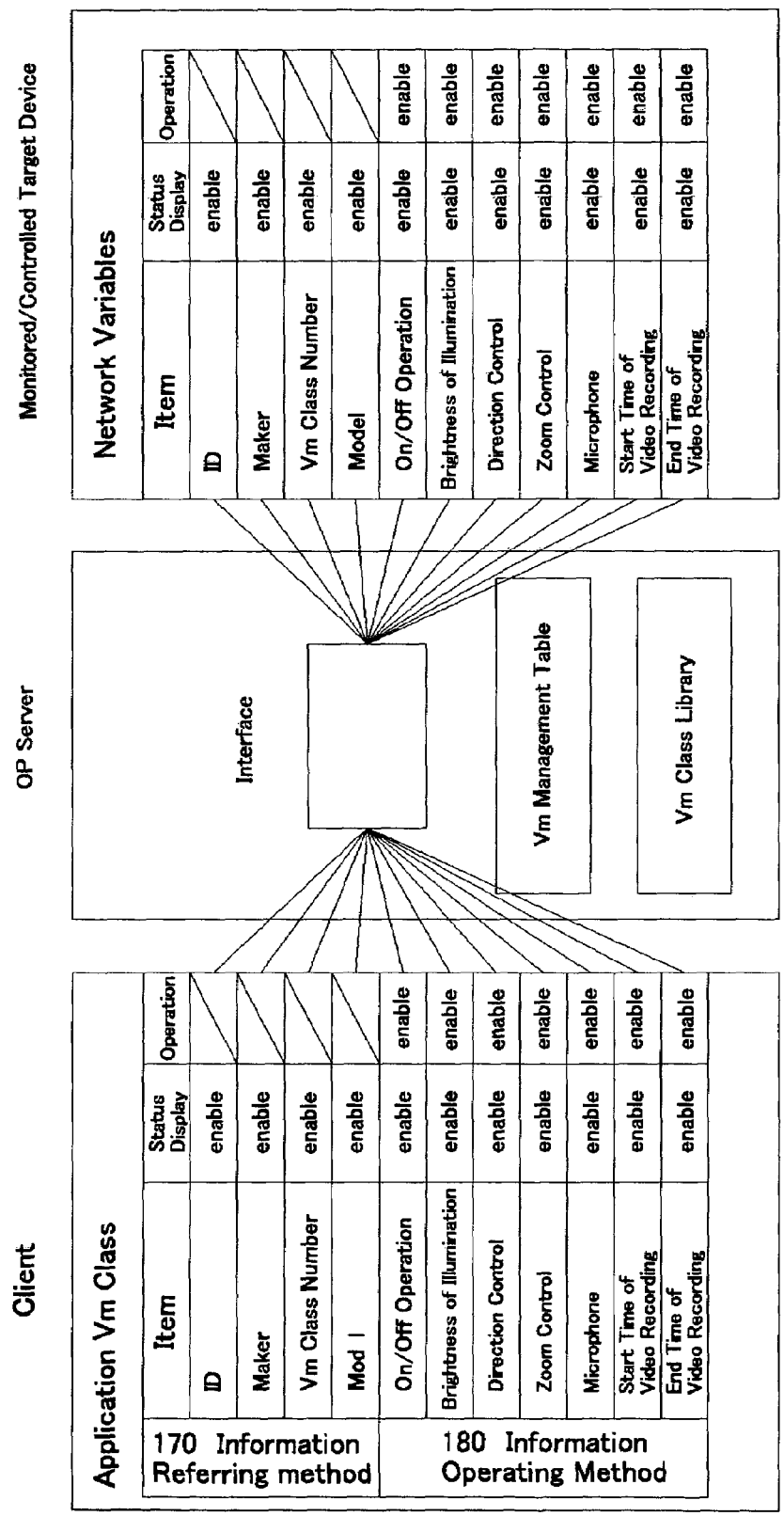
FIG. 5 is an explanatory view of a server program containing field variables corresponding to network variables of the monitored/controlled target devices, information referring methods for reading the field variables, and information operating methods for operating ones of the field variables which are allowed for change or setting.

Each of the Vm classes 141-143 contains, as shown in FIG. 5, field variables corresponding to the network variables of the monitored/-controlled target device, an information referring method 170 for reading those field variables, and an information operating method 180 for operating ones of the field variables which are allowed to change or set.

For example, the field variables of the monitoring camera Camera1 include the machine information such as the chip ID, the Vm class number, the maker and the model, the control information such as on/off information of the camera, brightness of illumination, direction control, zoom control and sound recording, and the status information representing the current control status.

In those field variables, varying data in the network variables are updated at a constant period (e.g., 1000 ms). Of the field variables, the index number indicating the installation position, etc. is settable by the user and is initially set to NULL.

Those field variables in the Vm class can be displayed by being referred to from the monitored/controlled target device with the status referring method, and can be set and controlled for the monitored/-controlled target device with the status operation method.

Since the Vm class has controlled items and displayed items different for each of the monitored/controlled target devices, it is designed and described by a maker manufacturing the monitored/-controlled target device. Alternatively, the Vm class may be designed and described by the client or the center after hearing the controlled items and the displayed items of the monitored/controlled target device from the maker manufacturing it. The Vm class can be called from a memory in the microcomputer constituting the monitored/controlled target device or the input/output unit. However, storing the Vm class in the computer requires an increased memory area. Therefore, the Vm class may be downloaded from a Vm distribution center provided on the Internet center, or may be read from a storage medium (e.g., an IC card, a PCI card, a magnetic disk or a CDROM) attached to the monitored/-controlled target device (or the input/output unit when the target device has no communication function).

A storage medium reader for reading a storage medium is required to read the Vm class from the storage medium. The storage medium reader may be built in or externally attached to the server, or it may be connected onto the control communication network.

When the storage medium reader is connected onto the control communication network, the Vm class for driving storage medium reader is installed in the reader itself. As an alternative, if a personal computer or a storage medium reader capable of performing control communication is connected on the control communication network, it is also possible to employ the connected personal computer or storage medium reader.

The Vm interface class library 150 collects and records therein Vm interface classes 151-153 . . . for connecting the Vm classes to the monitored/-controlled target device.

The collected Vm interface classes 151-153 . . . are each in pair to the Vm class distributed to the client or center side. Upon the client or center side designating a certain Vm class number, the Vm class corresponding to the designated Vm class number is distributed from the server to the client or center side. Further, on the server side, the Vm interface class file corresponding to the designated Vm class number is started up, whereby the Vm class on the client or center side and the interface class file on the server side are combined with each other.

The Vm interface classes 151-153 . . . have the respective Vm interface class numbers. The Vm interface class numbers are in pair to the Vm class numbers in a one-to-one relation. Upon the client or center side designating a Vm class number, the Vm interface class number corresponding to the designated Vm class number is called and the Vm interface class file having the called Vm interface class number is started up. The Vm class file on the client or center side is combined with the called Vm interface class file.

Each of the Vm interface classes 151-153 . . . contain protocols for performing control communication with the monitored/controlled target devices (such as Camera 1 and so on) on the control communication network.

Since the communication protocols are located on the control communication network in this case, control communication protocols are employed. However, in the case of the communication network using protocols in accordance with other standards (e.g., in a communication network constituted of wireless communication or optical communication, or a communication network constituted by dedicated lines), protocols used in the relevant communication network are employed.

The arrangement described above makes the system adaptable for a variety of monitored/controlled target devices and increases versatility.

<<HTTP Server>>

The HTTP server 120 for providing Vm to the client or the center is a WWW server. When the client or the center accesses the server using, e.g., Netscape Navigator provided by Netscape, Internet Explorer provided by Microsoft, or any other suitable Web browser, the HTTP server 20 distributes the Vm class to the client or the center in accordance with the Vm class number designated by the client or the center.

<<Client Machine and Center Server>>

The client is any of large-and small-scaled computers, a personal computer (PC), a mobile computer, a portable information terminal, a cellular phone with a character display function, and other information devices capable of utilizing wide area networks, which are located on a network.

Each of the client and the center requires a Vm operating program (hereinafter referred to simply as a "Vm application") described in an object oriented language for operating the Vm class in the server.

The Vm application must be equipped on the side of the client and the center. The Vm application may be downloaded or installed to the side of the client and the center via the Internet or from a storage medium such as a CDROM, a magnetic disk, a magnetic card or an IC card.

Before accessing the server, the URL, the Vm class number and the index number of the server to be operated are substituted into the Vm application. Alternatively, the URL, the Vm class number and the index number of the server and the phone number, etc. on the client side may be fixedly set in the Vm application beforehand. Preparing such a Vm application is advantageous in facilitating authentication to be made on the server side.

In the Vm application, authentication items of an operator himself or herself, such as a password, for accessing the server side are put, and authentication requirements for allowing access by the operator on the server side are set beforehand using a desired encryption scheme. The authentication requirements may be arranged beforehand between the client or the center and the server to change in an unfixed form depending on the date, the lapse of a certain time interval, or the access place so that the server is protected against access by a fictitious name of an unconcerned person.

When a user on the client or center side starts up the Vm application and designates the URL, the Vm number and the index number of the server included in the Vm application, the client or the center accesses the server with the Web browser and receives the Vm class from the server side, whereupon the client or the center is connected to the objective monitored/controlled target device through the server. The Vm class is combined with the Vm interface class for connection to the monitored/controlled target devices (such as Camera1 and so on) on the control communication network. As a result, a Vm object is produced and the current information of the monitored/-controlled target device is displayed on the client or center side.

When the user on the client or center side instructs the end of operation of the monitored/controlled target device to the Vm application, the Vm application vanishes the Vm object on the client or center side, whereupon the Vm interface class on the server side disappears.

<<Step of Registering Monitored/Controlled Target Device>>

A step of registering the monitored/controlled target device on the control communication network in the server will be described below.

When the monitored/controlled target device is connected to the control communication network, the monitored/controlled target device outputs the chip ID, the index number and the Vm class number of itself onto the control communication network. In the case of the monitored/-controlled target device having no communication function therein, the chip ID, the index number and the Vm class number are outputted onto the control communication network through the input/output unit having a communication function built therein. Using the monitored/controlled target device detecting program, the OP server 110 acquires the chip ID, the index number and the Vm class number of the monitored/controlled target device connected to the control communication network, and then records them in the Vm management table 130.

The monitored/controlled target device detecting program in the OP server searches for the Vm class and the Vm interface class corresponding to the acquired Vm class number. If the corresponding Vm class and Vm interface class are not present in the Vm class library 140 and the Vm interface class library 150, the OP server acquires the corresponding Vm class and Vm interface class from the Vm distribution center provided on the wide-area network, such as the Internet, or from the maker of the monitored/controlled target device. Of course, when the Vm class and the Vm interface class are recorded on a storage medium as mentioned above, the OP server acquires the Vm class and the Vm interface class from the storage medium reader.

As a result, the OP server 110 can be accessed from the client or center side on the WAN and/or the LAN.

<<Operation of Monitored/Controlled Target Device from Client or Center>>

When the client or the center accesses the OP server 110 and operates the monitored/controlled target device connected to the OP server 110, the client or the center starts up an application for making access to the OP server. Subsequent to the startup of the application, the user inputs, into the application, the URL, the Vm class number and the index number of the OP server 110, as well as the items required for the authentication proceedings.

After setting those items required for the accessing and the items required for the authentication, the application makes accesses the server.

Upon the access made from the client or the center to the server, the server performs the authentication of the client or the center.

When it is confirmed by the server's authentication that the access from the client or the center is allowed, the client or the center can make access to the OP server 110 in the server.

When the client or the center accesses the OP server 110 in the server, the OP server 110 distributes the Vm class designated by the application to the client or the center, and the Vm interface class corresponding to the Vm class distributed to the OP server 110 is started up.

Then, the Vm class distributed to the application in the client or the center requests its combination with the Vm interface class in the OP server 110, whereupon the Vm class in the client and the Vm interface class in the OP server 110 are combined with each other via the WAN and/or the LAN. The Vm interface class provides the network variables of the monitored/controlled target device on the control communication network to the Vm class in the client or the center, whereby the network variables are referred to and substituted in the field variable of the Vm class. As a result, the Vm class and the Vm interface class turn to a Vm object and a Vm interface object, respectively, and the current information of the monitored/controlled target device on the control communication network is displayed on the client or center side. The network variables referred to by the client or center side change at an interval of a predetermined time, but it is possible to refer to new network variables each time the network variables change because the information referring method on the client or center side always refers to the network variables.

When the field variables are operated by the information referring method on the client or center side, the operation is reflected on the network variables of the monitored/controlled target device through the Vm interface.

When the application is brought into an end on the client or center side, the Vm object in the client or the center disappears and the Vm interface object in the OP server 110 also disappears.

With this embodiment, as described above, the information of the monitored/controlled target device on the control communication network can be called, referred to and operated from the client or center side on the WAN and/or the LAN.

Further, since the Vm class is distributed from the OP server 110 in the server to the client or center side by copying, there is no fear that the Vm class on the side of the OP server 110 may be tampered. In addition, when the control information and the control method are changed upon, e.g., revision or version-up of a control program of the monitored/controlled target device, the Vm class and the Vm interface class of new version, for example, can be prepared at any time by updating the Vm class in the OP server 110 from the distribution center or the storage medium.

In this connection, the OP server 110 may periodically inquire whether the Vm classes and the Vm interfaces in the Vm class library 140 and the Vm interface class library 150 are updated to the latest version.

Further, with a modification in which the application on the client or center side is distributed from the OP server 110, the server is more flexibly adapted for model change and version-up on the client or center side, and the center and various clients can access the server so long as the authentication is established.

Additionally, when the monitored/controlled target device is disconnected from the control communication network, the Vm class in the Vm management table 130 becomes non-active. However, when the monitored/controlled target device is connected again to the control communication network, the Vm class of the monitored/controlled target device in the Vm management table 130 becomes active. Thus, the conditions of communication connection among the client or the center, the server and the monitored/controlled target device are established more quickly.

Furthermore, since the Vm class in the client or the center is used to just refer to the network variables of the monitored/controlled target device, the Vm class disappears as soon as the connection between the client or the center and the server is cut off. Also, the Vm class is represented using byte code. Accordingly, it is difficult to tamper the interface class and the network variables of the monitored/controlled target device.

<<Inclusive Virtual Machine and Supervising Virtual Machine>>

A description is now made of an inclusive virtual machine and a supervising virtual machine, which are used in the case of the system including many monitored/controlled target devices to efficiently share information in common with the respective devices, to quickly and smoothly perform control, and to enable devices as targets of linked control to perform more appropriate linked control while mutually referring to information among those devices.

The inclusive virtual machine means a virtual machine having functions of setting a virtual machine for each monitored/controlled target device connected to the server via the control communication network and a fixed agent describing functions such as behaviors of each virtual machine, and/or including even records acquired through each virtual machine. The supervising virtual machine supervises a plurality of inclusive virtual machines.

The following description is made with reference to the drawings.

Figure 6:
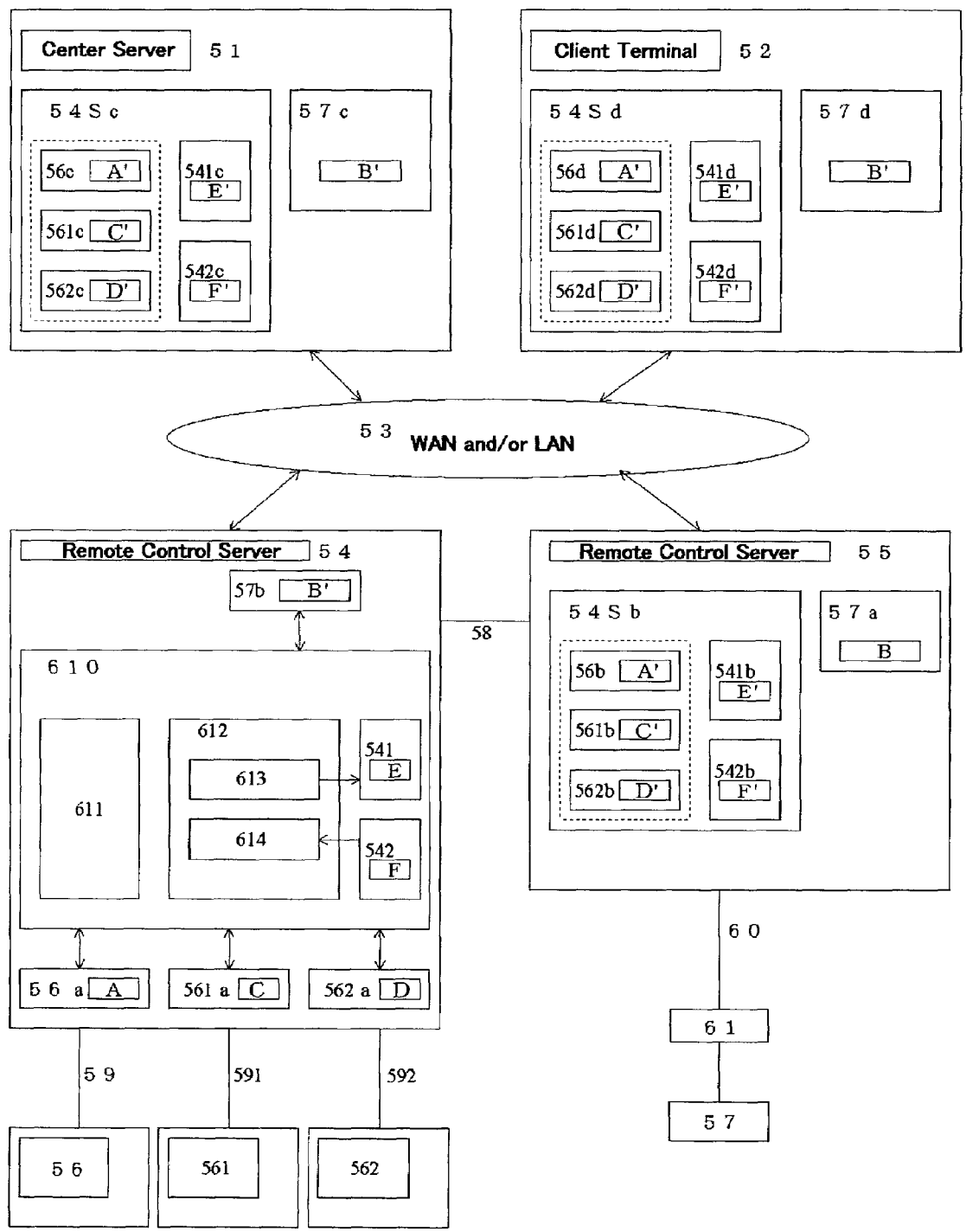
FIG. 6 is a system configuration diagram resulting when monitored/controlled target devices 561, 562 are newly connected to a remote control server 54 in the state of FIG. 2 for sharing information and performing monitoring/control by using an inclusive virtual machine.

FIG. 6 shows one example in which two monitored/controlled target devices 561, 562 are newly connected, via respective control communication networks 591, 592, to the remote control server 54 (hereinafter sometimes referred to simply as the "server 54") that is connected to the monitored/controlled target device 56 via the control communication network 59 as shown in FIG. 2.

More specifically, a fixed agent 610 always resides in the server 54, and the fixed agent 610 has a monitoring function 612 and a virtual machine including function 611. Of these functions, the monitoring function 612 contains a status monitoring/recording function 613 of monitoring the monitored/controlled target device through each virtual machine and of obtaining and then recording data, and a schedule/linked control function 613 of setting behaviors of each virtual machine. Also, the virtual machine including function 611 means a function of creating an inclusive virtual machine including setting 54 of virtual machines 56a, 561a, 562a for the monitored/controlled target devices connected to the server via the control communication network and of the fixed agent describing functions such as behaviors of each of the virtual machines, and including even records 541 acquired through each of the virtual machines. When creating the inclusive virtual machine, the information, setting and records included therein can be restricted to ones just required for the center or the client. This is advantageous in reducing the traffic amount.

When the center server 51 (hereinafter sometimes referred to simply as the "center 51") shares information in common with each monitored/controlled target device connected to the server 54 via the control communication network and monitors/controls the monitored/-controlled target device, the center 51 can share the information and monitor and control the target device by calling, holding and operating an inclusive virtual machine 54Sc created by the fixed agent 610 in the server 54. Also, when the client terminal 52 shares information and operates each monitored/controlled target device, it can likewise realize the sharing and the operation by calling, holding and operating an inclusive virtual machine 54Sd created by the server 54.

Figure 7:
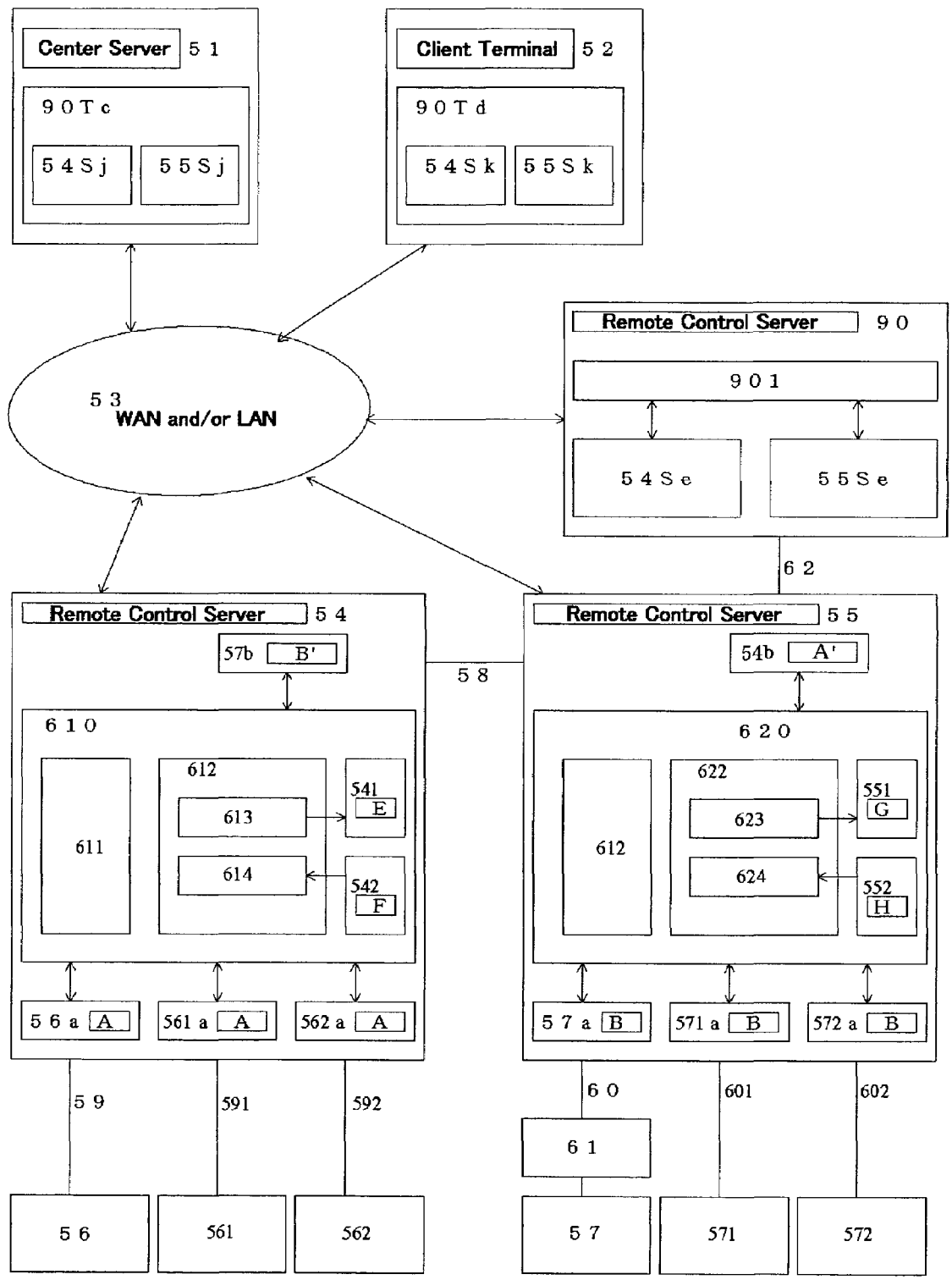
FIG. 7 is a system configuration diagram resulting when monitored/controlled target devices 571, 572 are also newly connected to a remote control server 55 in the state of FIG. 6 and a remote control server 90 is further connected for sharing information and performing monitoring/control by using a supervising virtual machine.

Further, when two monitored/controlled target devices 571, 572 are connected to the remote control server 55 (hereinafter sometimes referred to simply as the "server 55") via control communication networks 601, 602, respectively, as shown in FIG. 7, the center server can more quickly and smoothly share information in common with each monitored/controlled target device connected to each remote control server via the control communication network and can monitor and control the monitored/controlled target device by using a supervising virtual machine.

More specifically, in an example of FIG. 7, a remote control server 90 (hereinafter sometimes referred to simply as a "server 90") is connected to the server 55 via a control communication network 62, while the servers 54 and 55 are connected to each other via a control communication network 58. Further, a fixed agent 620 having the same functions as those of the fixed agent 610 in the server 54 always resides in the server 55. In addition, the server 90 has an inclusive virtual machine supervising function 901 for creating a supervising virtual machine to supervise inclusive virtual machines, each of which has been created by another server and has been called by and held in the server 90.

The server 90 calls and holds the inclusive virtual machines 54Se, 55Se created respectively by the servers 54, 55, and creates a supervising virtual machine 90Tc with the inclusive virtual machine supervising function 901. The supervising virtual machine 90Tc always shares information in common with the inclusive virtual machines 54Se, 55Se, which have been created by the servers 54, 55 and have been called by and held in the server 90. Also, the inclusive virtual machine 54Se always shares information in common with the virtual machines 56a, 561a, 562a held in the server 54, and the inclusive virtual machine 55Se always shares information in common with the virtual machines 57a, 571a, 572a held in the server 55. Further, the virtual machines 56a, 561a, 562a, 57a, 571a and 572a always share information in common with the respective monitored/controlled target devices. Therefore, since the supervising virtual machine 90Tc eventually always shares information in common with the monitored/controlled target devices connected to the servers 54, 55 via the control communication networks, the center 51 can efficiently share information in common with the respective monitored/controlled target devices connected to the servers 54, 55 via the control communication networks, and can quickly and smoothly perform control the respective monitored/controlled target devices by calling, holding and operating the supervising virtual machine 90Tc created by the server 90. Incidentally, when creating the supervising virtual machine, the information, setting and records included therein can also be restricted to ones just required for the center or the client. This is similarly advantageous in reducing the traffic amount.

Figure 8:
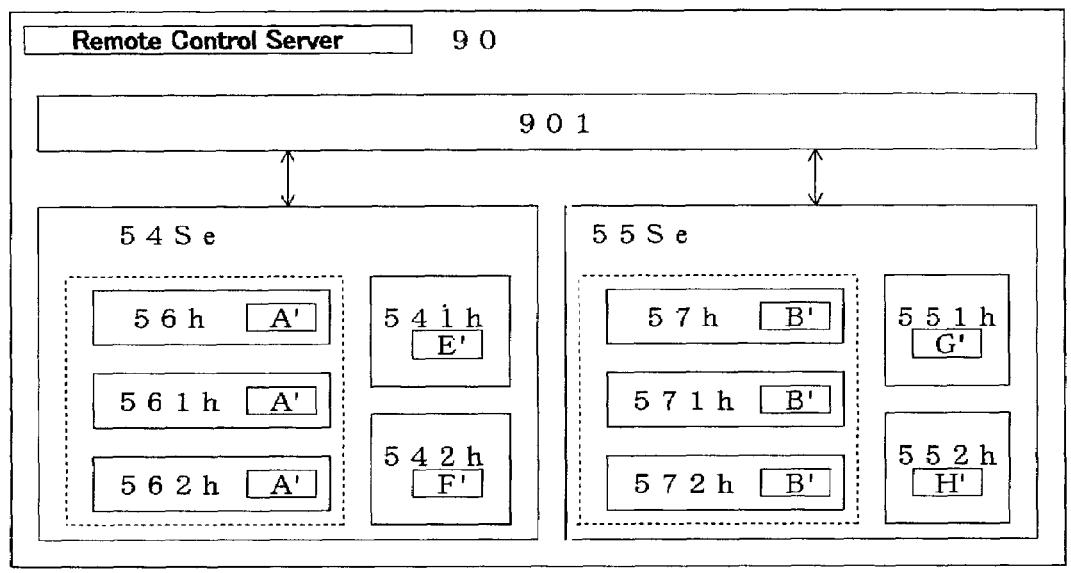
FIG. 8 is an explanatory view showing a state in which the remote control server 90 having an inclusive virtual machine function 901, shown in FIG. 7, calls and holds inclusive virtual machines 54Se, 55Se created by the remote control servers 54, 55, respectively.
Figure 9:
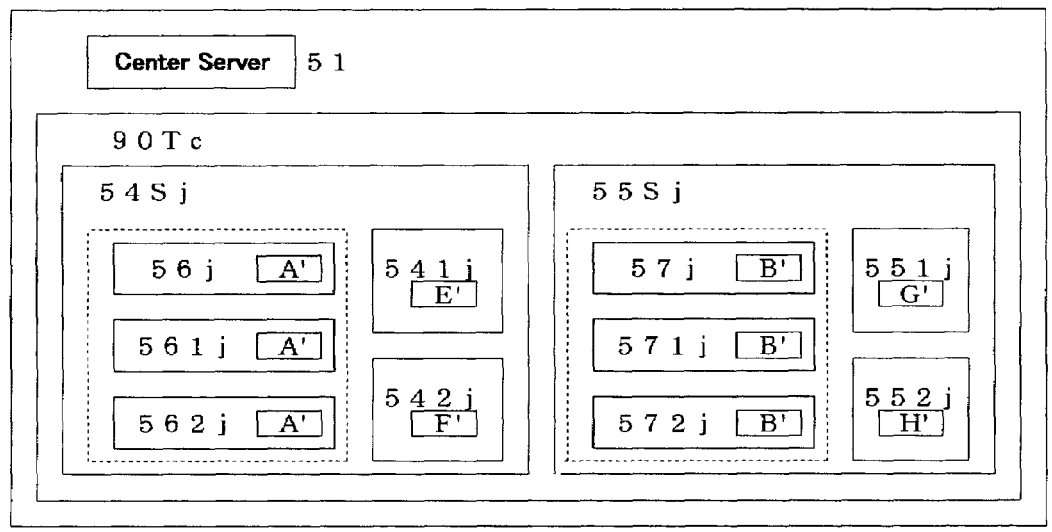
FIG. 9 is an explanatory view showing a state in which a center server 71, shown in FIG. 7, calls and holds a supervising virtual machines 90Tc created by the remote control server 90.

FIG. 8 shows a state in which the server 90 calls and holds the inclusive virtual machines 54Se, 55Se having been created respectively by the servers 54, 55, and FIG. 9 shows details of the supervising virtual machine 90Tc that is called by and held in the server 51 after being created by the server 90.

When the client terminal 52 in FIG. 7 shares information in common with the respective monitored/controlled target devices connected to the servers 54, 55 via the control communication networks and monitors/controls the target devices, the client terminal can likewise perform the sharing and the monitoring/control by calling, holding and operating a supervising virtual machine 90Td.

Thus, by utilizing the inclusive virtual machine and the supervising virtual machine, the center can efficiently share information and operate the monitored/controlled target device with no needs of sharing information in common with the individual monitored/controlled target devices and calling, holding and operating the virtual machines for the individual monitored/controlled target devices to be subjected to monitoring/control.

Incidentally, a step of registering the inclusive virtual machine and the supervising virtual machine is substantially the same as the step of registering the monitored/controlled target device.

As described above, it is possible to call, hold and/or operate a virtual machine, which is a software object described as the other self of each monitored/controlled target device having the same information as that possessed by the monitored/controlled target device and contains a plurality of communication protocols used for communication with the monitored/controlled target device and concealed in the software object, and/or an inclusive virtual machine including setting of a plurality of virtual machines for the monitored/controlled target devices and of a fixed agent describing functions such as behaviors of each of the virtual machines, and/or including even records acquired through each of the virtual machines, and a supervising virtual machine for supervising a plurality of inclusive virtual machines, and/or possible to distribute the virtual machines, the inclusive virtual machines and the supervising virtual machine. Further, it is possible to share the same information as that possessed by the monitored/controlled target device, and to change information of each monitored/controlled target device and/or to monitor and control the target device by operating the corresponding virtual machine.

<<Applications>>

Applications to the following fields are conceivable.
  a. Remote monitoring, remote control and maintenance of various devices and apparatuses for the electrical industry.
  b. Remote monitoring, remote control and maintenance of various industrial devices and apparatuses.
  c. Remote monitoring, control and maintenance of various devices, apparatuses and facilities for agriculture and fisheries.
  d. Remote equipment monitoring for buildings, dormitories, apartments, etc., and automatic inspection of meters for individual rooms.

e. Remote monitoring and remote maintenance of building equipment such as regenerative air conditioners. Optimum regenerative control through, e.g., distribution of operation schedules.

f. Remote control and maintenance of remote education devices.

g. Data collection, providing and processing services.

h. Monitoring system for crime and fire prevention.

i. Environment measurement and measured data automatic collecting system.

j. Energy-saving diagnosis data collecting system.

The following operative advantages are obtained.

(1) Because the server employs the real-time OS that is adopted in space ships as well, high reliability is ensured. Also, because the server is an application server, the stable operation is ensured even with startup of various user applications.

Further, a development environment with a shorter lead time using Java can be provided, and efficient system construction can be achieved.

(2) Due to very high resistance against weather and environments, stable 24-hour operation is realized.

(3) The WAN and/or LAN can be advantageously utilized. Also, wide-range support is realized with the control communication function.

Communication charge can be reduced by utilizing the Internet network, and the control communication network, such as the PHS and cellular phones, can be used in areas where wired lines are not installed. The system can be hence constructed in a wider area than conventional systems.

(4) When the virtual machine is operated on any computer connected to the network, it always shares the same information as that possessed by the actual virtual machine, management of a device in a remote place can be realized by operating and managing the virtual machine on hand.

Also, because the virtual machine can be utilized as a software part in development of software, an advanced monitoring/control system can be constructed without knowledge regarding data communications and measurement control.

Further, because change of the system, setting of various parameters, etc. can be performed via the network, the frequency of replacement of devices and the frequency at which engineers must actually go to sites are reduced. The maintenance cost is hence cut down.

(5) The communication charge can be reduced by utilizing the transceiver mode.

(6) Because the remote control server autonomously perform control, an influence upon the site is small even when the center goes down. Also, because a notice is sent only in the event of abnormality and information is communicated just when an occasion requires, the communication charge is cut down.

(7) Even when there are a plurality of monitored/controlled target devices and makers of those target devices differ from each other, the status information and the control information for each target device can be viewed, operated and managed with the corresponding virtual machine displayed on the client terminal at hand or the center server.

Details of the present invention will be described in connection with examples. It is to be noted that the present invention is in no way limited by the following examples.

EXAMPLES

<<Outline of the Invention>>

A remote control server of the present invention has a data server function of integrating monitored/controlled target devices on a control communication network and providing monitoring/control data, etc. to an information system, and various application server functions capable of executing processes for fields on demand in response to a request from the information system.

Also, the remote control server of the present invention serves also as an application server, and therefore stability and reliability of software are ensured, for example, in point of that the stable operation is ensured even with startup of various user applications.

Further, the remote control server of the present invention has resistance against environments enough to operate 24 hours under such a severe environment as outdoor, and has a small size suitably adapted for a site space.

Next, features of the remote control server in terms of hardware will be described.

The remote control server of the present invention includes a public line communication device (e.g., a communication device such as a wired or wireless phone) as standard, and it can also be provided with an external communication device (such as a modem) giving a serial communication function when a communication standard is switched over to RS232C.

Also, the remote control server of the present invention has an Ethernet port for communication with a system connected to another medium, such as a client computer, and includes, e.g., LONWORKS provided by ECHELON for communication with the monitored/controlled target device and the input/output unit. In addition, the remote control server has a serial communication port (capable of switching between RS232C and RS422) for communication with a device having a serial communication interface. Thus, the remote control server includes various connection devices enabling both information and control communications to be performed.

The remote control server of the present invention has a digital input (DI; one point) capable of directly collecting data from the monitored/controlled target device, and also has a RS232C port as a connection interface dedicated for a maintenance control.

The remote control server of the present invention can supply electric power from a control communication port to the monitored/-controlled target device and the input/output unit. In addition, the remote control server has the function capable of protecting data in a memory area in the event of power-down and recording the date and time of the power-down, and includes a software input switch, a hardware reset switch, etc., which provide respective timing inputs for starting software installation and maintenance to an external storage.

Next, features of the remote control server from the viewpoint of software function will be described.

The remote control server of the present invention includes a real-time OS (such as ITRON or Vx-WORKS), and performs management of the monitored/controlled target device on the control communication network. Also, it has a client server function of linking the control communication network and the information communication network with each other, an agent server function capable of installing a stationary agent, etc., and an HTTP server function capable of transmitting and receiving information in the form of an HTML file through the WWW system. Further, the remote control server includes, as standard, an environment operating under the Java run environment, and realizes installation of the Java run environment with a small-capacity resource.

Moreover, the remote control server has a PPT (Point to Point Protocol) connection function necessary for connection to the public line network such as the PHS and the modem, and has the function capable of performing data exchange using wireless phones, e.g., the PHS, via public lines and the function being effective to construct a system in a place where laying-down of cables is infeasible and to realize connection to a mobile medium. Further, by connecting a router to the Ethernet, data exchange with an external system can be made, and bi-directional call from the remote control server to a personal computer (client mode) and from the personal computer to the server can be realized. Since the PPP connection can be controlled from Java applications, it is possible to issue, e.g., an emergency call for an alarm notice.

The remote control server has the FTP function and the TELNET function for transfer of files and data to and from a client terminal, a center server and/or an external system. Also, the remote control server has an environment for executing and managing Java applications under a network environment, and is able to process digital inputs with the Java applications.

In addition, the remote control server can record log messages in a nonvolatile memory located in the server with a system log management function, and has a mail transmitting function capable of communicating with a system managing person, a device managing person, etc. by transmitting, as electronic mails, an alarm message, etc.

As a monitoring function, a remote station system makes a fixed agent reside on the server, and performs information collection from and monitoring/control of the monitored/controlled target devices. Also, the server can process and compute the collected information. By including, for example, a billing algorithm beforehand, the usage charge of the monitored/controlled target device can be calculated based on the number of times of usages, the power supply time, the amount of electricity used, etc. of the target device.

Those functions are described below in detail. First, the remote control server can collect and store information of the various monitored/controlled target devices in accordance with a registered schedule. The agent collects information directly from the monitored/controlled target devices or through input/output units. Further, the server stores records of status changes at a designated point, stores analog values (trend records) at designated cycles, and creates daily reports, monthly reports, etc.

The server can notify information and current values of the monitored/controlled target devices in response to requests from the client and the center, can display the current values through the virtual machines, and can browse the stored data via the network. By transferring files and data to another server, etc. in an external system using the FTP function, it is possible even for the external system side to accumulate the data and to perform management, storage, a billing process, etc. on the accumulated data by batch operations. Further, it is possible to execute a close and statistical data analysis for a long period.

When an abnormality occurs in the various monitored/controlled target devices, the server can inform the occurrence of an abnormality to a preset monitoring place. For example, when an analog value reaches an abnormal level in the event of a device abnormality or beyond upper and lower limit setting values, an alarm can be transmitted in the form of an E-mail.

Further, the server can perform operation control in accordance with setting details preset for each of the monitored/controlled target devices by utilizing, as a trigger, a factor such as a device status (on/off), an information change, and timer setting time.

The scheduled operation function is a function of performing automatic start/stop control (device on/off) in accordance with a time schedule set for each of various equipment and devices. A "schedule pattern" has a schedule in units of week and enables the operation time to be set for each day of the week. The start/stop time can be set in units of minute from 0 hour to 24 hours for each day to designate the time zone (indicated by the time of day) during which the operation is to be performed. The number of times of on/off switching per day can be registered based on the setting of the on/off time.

The device linkage operation can be performed by, depending on the operational status of a linked device (linkage source), making on/off control of a target device (linkage destination) in accordance with information defined in setting for registration of the linked devices.

An on/off condition and an AND/OR condition can be set as conditions for the linkage source, and an on/off condition can be set as conditions for the linkage destination.

Further, since the fixed agent has the virtual machine including function, it is possible to set a plurality of virtual machines for the monitored/controlled target devices and a fixed agent describing functions such as behaviors of each of the virtual machines, and/or to create, hold, operate and/or distribute an inclusive virtual machine including even records acquired through each of the virtual machines.

Moreover, when the fixed agent has the inclusive virtual machine supervising function, it is possible to call, hold and/or operate a supervising virtual machine for supervising a plurality of inclusive virtual machines, and/or to distribute the supervising virtual machine.

By using the inclusive virtual machines and the supervising virtual machine, it is possible to quickly and smoothly share and control information, and to efficiently perform linked control among a variety of devices, when the number of devices to be controlled is increased to a large extent and the devices are monitored/controlled among many offices.

The remote control server of the present invention has the following features.

(1) The remote control server employs Vx-WORKS as the real-time OS. Also, the server includes, as standard software, a Java run environment with a small-capacity resource.

(2) Due to very high resistance against weather and environments, 24-hour operation is realized.

(3) The remote control server includes, as standard, the public line communication function such as the PHS and cellular phones. It also includes, as an extension port, an Ethernet port for communication with an external system. Further, it employs LONWORKS for control communication. As other communication ports, it includes a 2-port serial line and a digital input interface for monitoring external devices.

(4) The remote control server has the function of creating, holding and distributing a virtual machine (pure software object with Java) that always holds the same information as that possessed by an actual device/apparatus located at a remote position.

(5) When there are a large number of monitored/controlled target devices and the number of devices to be monitored/controlled is increased to a large extent, the remote control server has the function of creating, holding and/or operating an inclusive virtual machine including setting of a plurality of virtual machines and a fixed agent describing functions such as behaviors of each of the monitored/controlled target devices, and including even records acquired through each of the virtual machines, and a supervising virtual machine for supervising a plurality of inclusive virtual machines. By browsing and operating the information of the inclusive virtual machines and the supervising virtual machine, it is possible to quickly and smoothly monitor and control many monitored/-controlled target devices, and to efficiently perform linked control in a variety of forms.

(6) The client and the center can access the remote control server via the WAN and/or LAN and can always share information in common with the virtual machines for the monitored/controlled target devices so as to display the monitored/controlled data and input control commands to the virtual machines held in the client and the center. Hence, the client and the center are given with the function capable of controlling the monitored/controlled target devices from them.

(7) A client computer installed in a monitoring/control center, a data collection center, or the like is given with the function capable of distributing an agent via the network and causing the agent to access the virtual machine, which always shares information in common with the monitored/controlled target device to be controlled, and to operate the virtual machine, thereby controlling the monitored/controlled target device.

(8) The remote control server can directly receive and hold commands and agents distributed from the client and the center via the network. By deciding a key remote control server and a distribution route in advance, the function of cyclical distribution can be realized with the use of PHS lines or the PHS transceiver mode.

(9) By making the fixed agent always reside, the remote control server can collect and store data in accordance with a registered schedule, can execute data processing such as a billing process, and can store the processed data. Also, the server can distribute data to the client and the center in response to a request from an external communication device, and can autonomously inform abnormal data if it occurs. Thus, the individual remote control servers have functions of performing monitoring/control in an autonomous and decentralized manner, and executing collection, processing and distribution of data.

(10) The remote control server can receive an agent transmitted from the client terminal or the center server and including an algorithm to change behaviors of the monitored/controlled target device, hold the agent in an external storage, and operate the agent for changing the behaviors of the monitored/controlled target device. It is also possible to change the behaviors of the monitored/controlled target device by operating the virtual machine, the inclusive virtual machine and the supervising virtual machine, which are held in the remote control server, and then changing control information such as setting values.

The center server according to the present invention has the following features.

(1) The center server has the function of creating, holding and distributing a virtual machine (pure software object with Java) that always holds the same information as that possessed by an actual device/apparatus located at a remote position.

(2) The center server has the function of creating, holding, operating and/or distributing an inclusive virtual machine including setting of a plurality of virtual machines and a fixed agent describing functions such as behaviors of each of the monitored/controlled target devices, and including even records acquired through each of the virtual machines, and a supervising virtual machine for supervising a plurality of inclusive virtual machines.

(3) The center server has the function of always sharing information, via the WAN and/or LAN, in common with the virtual machines for the monitored/controlled target devices, the inclusive virtual machines, and the supervising virtual machine, which are held in the remote control server, so as to display the monitored/controlled data, and of controlling the monitored/controlled target devices by inputting control commands to the virtual machines held in the center server.

(4) The center server installed in a monitoring/control center, a data collection center, or the like can distribute an agent via the network, access the virtual machine that always shares information in common with the monitored/controlled target device to be controlled, and operate the virtual machine, thereby controlling the monitored/controlled target device.

(5) Commands and agents distributed from the center server can be directly transmitted to the remote control server via the network. By deciding a key remote control server and a distribution route in advance, the function of cyclical distribution can be realized with the use of PHS lines or the PHS transceiver mode.

(6) The records not only collected through the virtual machines and stored in, but also processed and stored in the fixed agent held on the remote control server can be transmitted to the center server in response to commands from the center server. The center server can store and process (including billing process) the transmitted records.

(7) The center server can transmit an agent including an algorithm for the monitored/controlled target device to the remote control server, and the remote control server can receive and hold the transmitted agent in an external storage, and then operate the agent for changing the behaviors of the monitored/controlled target device. It is also possible to change the behaviors of the monitored/controlled target device in the site, without actually going to the site, by operating the settings included in the virtual machine, the inclusive virtual machine or the supervising virtual machine to specify the behaviors of the target device.

(8) The billing and charging process for each of the monitored/-controlled target devices can be more quickly and easily performed by transmitting a command from the center server to the remote control server, causing the records held in the remote control server to be sent to the center server, and receiving, holding and converting the received records into billing information in the center server.

(9) In a system in which the center server is connected via the WAN and/or LAN to one or more remote control servers, each of which is connected to one or more monitored/controlled target devices via respective control communication networks, it is possible to perform system management such as time synchronization, agent management, service application management, and collected data management.

<<Description of Example with Reference to Drawings>>

Figure 10:
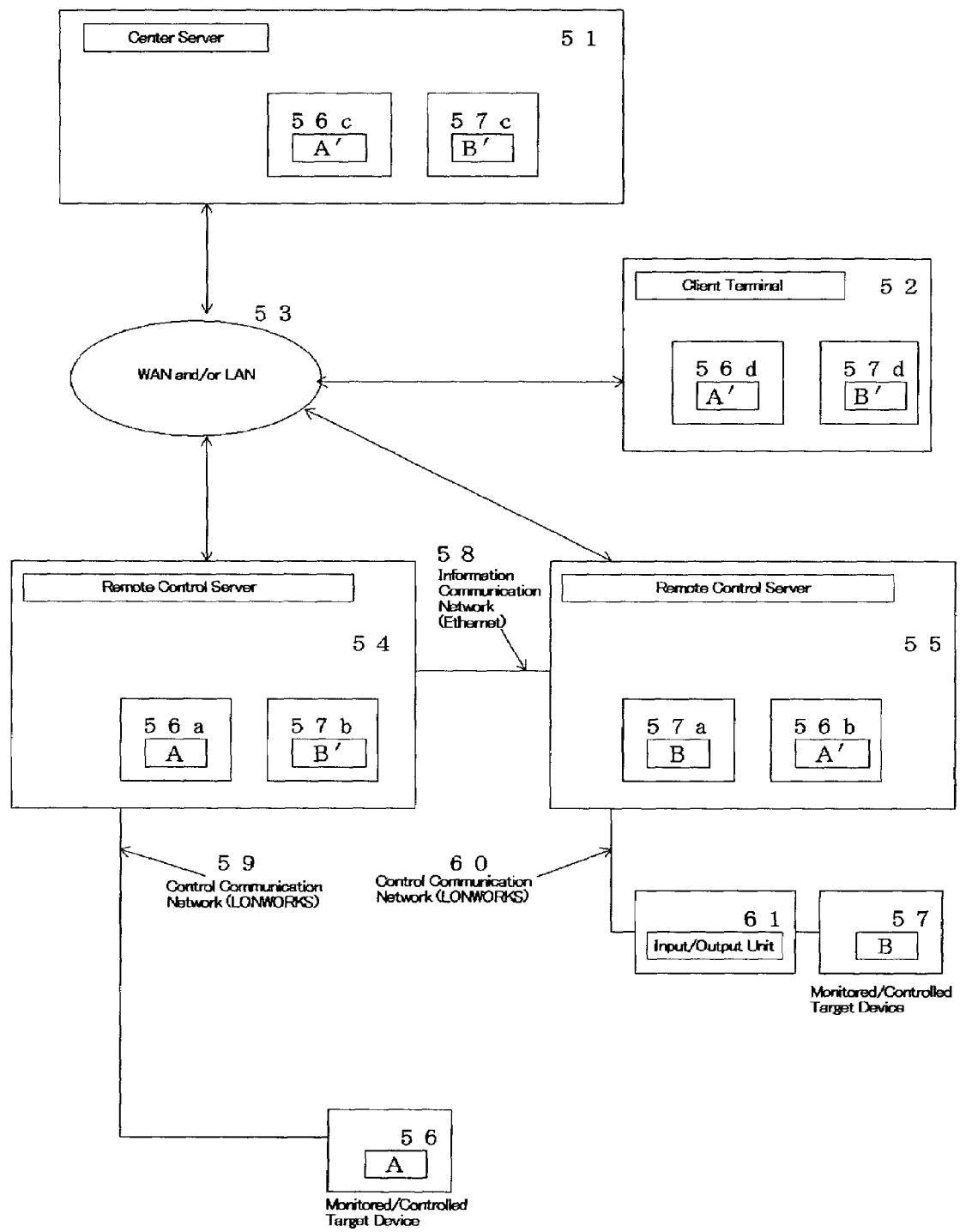
FIG. 10 is an explanatory view showing a system in which the monitored/controlled target devices are monitored and controlled via a WAN and/or LAN by a center server or a client terminal, which is connected to two servers positioned as remote control servers connected to the monitored/-controlled target devices through control communication ports.

An example of the present invention will be described below with reference to FIG. 10. FIG. 10 shows a system example in which a client terminal and a center server are connected via a WAN and/or LAN to one or more servers, which are positioned as remote control servers connected to the monitored/controlled target devices through control communication ports (two remote control servers in the example of FIG. 10), and the monitored/controlled target devices are monitored/controlled by the center server or the client terminal.

More specifically, a center server 51 and a client terminal 52 are connected to remote control servers 54, 55 via a WAN and/or LAN 53. The remote control server 54 is connected to a monitored/controlled target device 56 having a control communication function via a control communication network 59. Since a monitored/controlled target device 57 has not the control communication function, the remote control server 55 is connected to the monitored/controlled target device 57 from a control communication network 60 through an input/output unit 61 having the control communication function. Further, the remote control servers 54, 55 are connected via an information communication network 58 (Ethernet in this example).

In this example, the control communication between the monitored/controlled target device and the remote control server is performed using LONWORKS (trade name registered by ECHELON in U.S.A.).

The remote control server 54 collects the latest data from the monitored/controlled target device 56 connected to the control communication network 59, and holds a virtual machine 56a for the monitored/controlled target device 56. Likewise, the remote control server 55 collects the latest data from the monitored/controlled target device 57 through the input/output unit 61 connected to the control communication network 60, and holds a virtual machine 57a for the monitored/controlled target device 57.

On the other hand, the center server 51 holds in itself a virtual machine 56c that always shares information via the WAN and/or LAN 53 in common with the virtual machine 56a for the monitored/controlled target device 56, which is held in the remote control server 54. The center server 51 also holds in itself a virtual machine 57c that always shares information via the WAN and/or LAN 53 in common with the virtual machine 57a for the monitored/controlled target device 57, which is held in the remote control server 55.

Similarly, the client terminal 52 holds in itself virtual machines 56d, 57d that always share information in common with the virtual machines 56a, 57a for the monitored/controlled target devices 56, 57.

Further, the remote control server 55 holds the virtual machine 56b that always shares information in common with the virtual machine 56a for the monitored/controlled target device 56 connected to the remote control server 54. The remote control server 55 holds the virtual machine 57b that always shares information in common with the virtual machine 57a for the monitored/controlled target device 57 connected to the remote control server 55 through the input/output unit 61.

Because the virtual machines held in the center server 51 and the client terminal 52 always share information in common with the virtual machine held in the remote control servers 54, 55, the center server 51 and the client terminal 52 always share information in common with the monitored/controlled target devices 56, 57 and hence can display the current information of the monitored/controlled target devices 56, 57.

When controlling the monitored/controlled target device 56 from the center server 51, control information of the virtual machine 56a for the monitored/controlled target device 56, which is held in the remote control server 54, is written by operating the virtual machine 56c that always shares information in common with the monitored/controlled target device 56 held in the center server 51. Also, since the remote control server 54 always shares information in common with the monitored/controlled target device 56, the monitored/controlled target device 56 is also controlled. The controlled result is sent back to the center server 51 in a flow reversal to that described above.

Control of the monitored/controlled target device 56 connected to the remote control server 54 via the control communication network 59 is also performed from the client terminal 52 in a similar manner.

Next, a description is made of the case of performing linked control between the monitored/controlled target devices 56 and 57 which are connected respectively to the remote control servers 54, 55 via the control communication networks 59, 60.

In this case, the remote control server 55 includes a fixed agent, which always resides therein and is inputted in advance so as to control the monitored/controlled target device 56 if there is an abnormality in the monitored/controlled target device 57.

When the remote control server 55 detects, e.g., an abnormality of the monitored/controlled target device 57 and controls the monitored/controlled target device 56 as a linked target device, abnormal information of the monitored/controlled target device 57 is first detected by the remote control server 55 via the control communication network 60 through the input/output unit 61, whereupon the information of the virtual machine 57a for the monitored/controlled target device 57 is changed.

Upon a change in information of the virtual machine 57a for the monitored/controlled target device 57, the fixed agent held in the remote control server 55 is started up and operates the virtual machine 56b, which always shares information in common with the virtual machine 56a for the monitored/controlled target device 56 held in the remote control server 54, for the purpose of operating the monitored/controlled target device 56 set as a linkage destination in advance. Upon a change in information of the virtual machine 56b held in the remote control server 55, the information of the virtual machine 56a is changed because the virtual machine 56a held in the remote control server 54 always shares information in common with the virtual machine 56b. Correspondingly, the monitored/controlled target device 56 is controlled because the virtual machine 56a always shares information in common with the monitored/controlled target device 56.

On the other hand, since the virtual machines 56c, 57c held in the center server 51 and the virtual machines 56d, 57d held in the client terminal 52 always respectively share information in common with the virtual machines 56a, 57a for the monitored/controlled target devices 56, 57 held in the remote control servers 54, 55, the result of the linked control is also reflected on the center server 51 and the client terminal 52.

Looking at a series of the above-mentioned operational flow from the outside, it appears that, just by operating the virtual machines held in the center server 51 and the client terminal 52, the virtual machines are each moved through the WAN and/or LAN 53 with network transparency and control the monitored/controlled target devices.

As a more practical application example, the case of performing a billing process for each of the monitored/controlled target devices will be described below with reference to FIG. 10.

The remote control server 54 obtains various data of the monitored/controlled target device 56, such as the number of times of usages, the power supply time, the amount of electricity used, status information, and operating information, through the virtual machine 56*a* for the monitored/controlled target device 56, and stores the data in an external storage associated with the remote control server 54. Likewise, the remote control server 55 obtains various data of the monitored/-controlled target device 57 through the virtual machine 57*a* for the monitored/controlled target device 57, and stores the data in an external storage associated with the remote control server 55.

In response to a command from the center server 51, and/or when fixed agents always residing in the remote control servers 54, 55 are each operated at the preset timing (e.g., a.m. 0:00 per day), the remote control servers 54, 55 transmit, to the center server 51, the various data of the monitored/controlled target devices 56, 57 stored in the respective external storages associated with the remote control servers 54, 55. Upon receiving the various data transmitted from the remote control servers 54, 55, a processing unit in the center server 51 converts the received data into data for billing for each of the monitored/controlled target devices and stores the converted data in a storage in the center server 51. Then, based on preset parameters (such as the number of times of usages and the amount of electricity used) and algorithm, the processing unit in the center server 51 calculates the usage charge for each of the monitored/controlled target devices, stores the calculated charge in the storage in the center server 51, and actuates a linkage to perform a paying process such as debiting on account opened in a financial institution.

When an agent containing an algorithm to execute the billing process is installed to always reside in each of the remote control servers 54, 55, the remote control servers 54, 55 execute the billing process based on the data of the monitored/controlled target devices 56, 57, which are stored in the respective external storages, and store the resulted charges in the respective external storages. Then, in response to a command transmitted from the center server 51 to the remote control servers 54, 55, and/or when fixed agents always residing in the remote control servers 54, 55 are each operated at the preset timing (e.g., a.m. 0:00 per day), the billing information held in the remote control servers 54, 55 is transmitted to the center server 51. The center server 51 receives the transmitted billing information, stores the received information in its storage, and actuates a linkage to perform a paying process such as debiting on account opened in a financial institution. As a result, the load imposed on the center server can be reduced.

Figure 11:
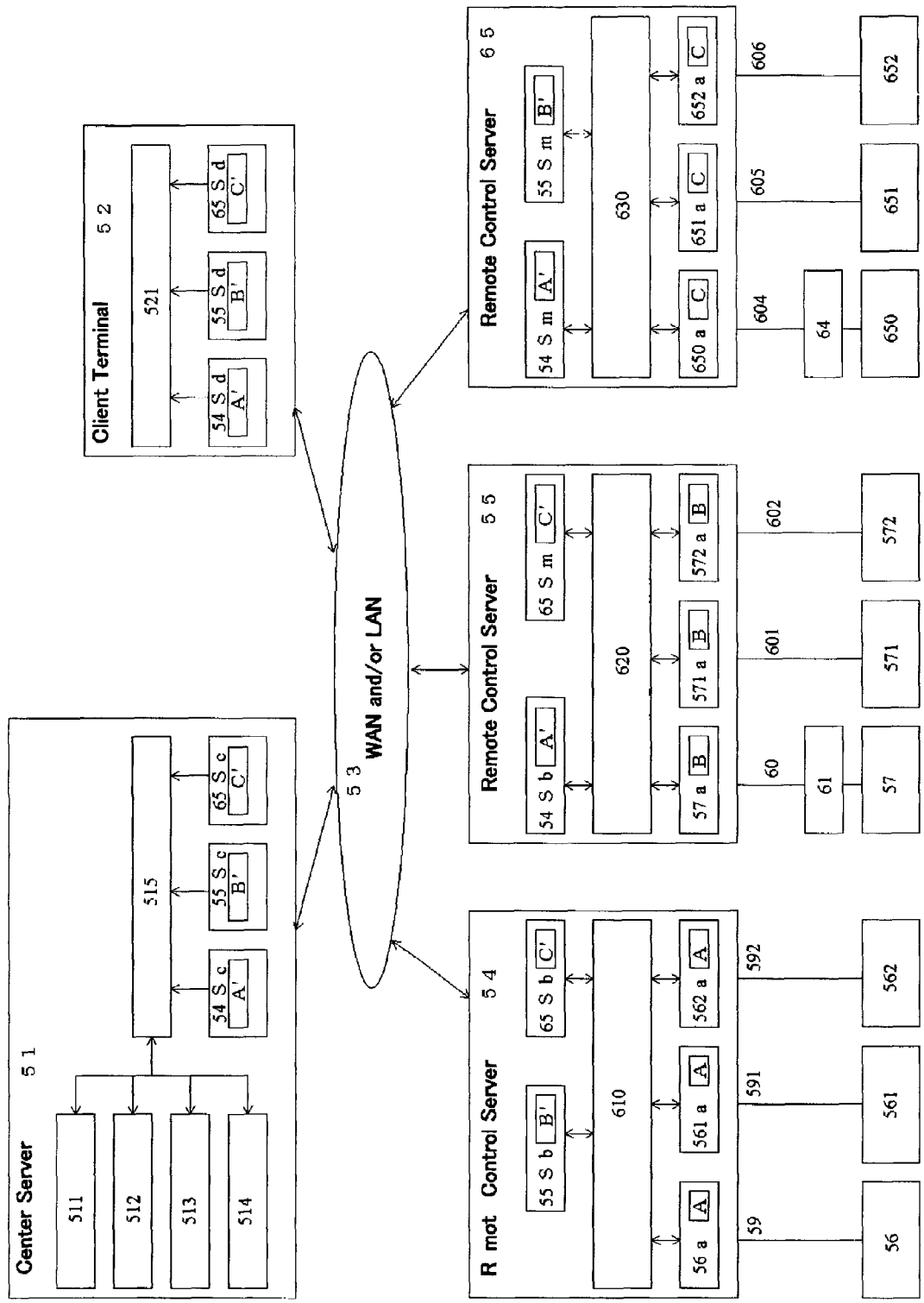
FIG. 11 is an explanatory view showing a state in which the number of the monitored/controlled target devices is increased from the state of FIG. 6 for sharing information and performing monitoring/control and linked control by using the inclusive virtual machine.

Finally, a method of quickly and efficiently performing monitoring and control by utilizing an inclusive virtual machine in the case, in which the number of target devices capable of being monitored/controlled by one remote is, e.g., hundred and tens and the total number of actually monitored/controlled target devices amounts to the order from several hundreds to several thousands, will be described below with reference to FIG. 11. As with the example of FIG. 10, this example also employs LONWORKS as a control communication network for connecting the remote control server and the monitored/controlled target device to each other.

More specifically, a center server 51 and a client terminal 52 are connected to remote control servers 54, 55, 65 via a WAN and/or LAN 53. The remote control server 54 is connected to a monitored/controlled target device 56 having a control communication function via a control communication network 59, to a monitored/controlled target device 561 via a control communication network 591, and to a monitored/controlled target device 562 via a control communication network 592. Since a monitored/controlled target device 57 has not the control communication function, the remote control server 55 is connected to the monitored/-controlled target device 57 from a control communication network 60 through an input/output unit 61 having the control communication function. Further, the remote control server 55 is connected to a monitored/controlled target device 571 via a control communication network 601 and to a monitored/controlled target device 572 via a control communication network 602.

In addition, since a monitored/controlled target device 650 has not the control communication function, the remote control server 65 is connected to the monitored/controlled target device 650 from a control communication network 640 through an input/output unit 64 having the control communication function. Moreover, the remote control server 65 is connected to a monitored/controlled target device 651 via a control communication network 605 and to a monitored/controlled target device 652 via a control communication network 606.

The remote control server 54 creates and holds the virtual machine 56*a* for the monitored/controlled target device 56 on the control communication network 59, collects the latest data through the virtual machine 56*a*, and shares information in common with the monitored/-controlled target device 56. Also, the remote control server 54 creates and holds the virtual machine 561*a* for the monitored/controlled target device 561 on the control communication network 591, collects the latest data through the virtual machine 56*a*, and shares information in common with the monitored/controlled target device 561. Likewise, the remote control server 54 creates and holds the virtual machine 562*a* for the monitored/controlled target device 562 on the control communication network 592, collects the latest data through the virtual machine 562*a*, and shares information in common with the monitored/controlled target device 562.

The remote control server 55 similarly collects the latest data through the virtual machines 57*a*, 571*a* and 572*a* for the monitored/-controlled target devices 57, 571 and 572 connected to the remote control server 55 via the control communication networks 60, 601 and 602, respectively, and shares information in common with the monitored/-controlled target devices 57, 571 and 572.

Further, the remote control server 65 similarly collects the latest data through the virtual machines 650*a*, 651*a* and 652*a* for the monitored/controlled target devices 650, 651 and 652, respectively, and shares information in common with the monitored/controlled target devices 650, 651 and 652.

On the other hand, the fixed agent 610 having both a monitoring function, including a status monitoring/recording function and a schedule/linked control function, and a virtual machine including function always resides in the remote control server 54. Likewise, the fixed agent 620 having the same functions as those of the fixed agent 610 in the remote control server 54 always resides in the remote control server 55. Also likewise, the fixed agent 630 having the same functions as those of the fixed agent 610 always residing in the remote control server 54 always resides in the remote control server 65.

Based on the virtual machine including function of the fixed agent 610, the remote control server 54 can create, hold, operate and distribute an inclusive virtual machine including setting of the virtual machines 56*a*, 561*a* and 562*a* for the monitored/controlled target devices 56, 561 and 562 connected to the remote control server 54 via the respective control communication networks and setting of the schedule/linked control function contained in the fixed agent 610 and describing the functions, such as behaviors, of those virtual machines, and including even records acquired through the virtual machines with the status monitoring/recording function contained in the fixed agent 610.

Also, based on the virtual machine including function of the fixed agent 620, the remote control server 55 can create, hold, operate and distribute an inclusive virtual machine including the setting of the virtual machines 57a, 571a and 572a for the monitored/controlled target devices 57, 571 and 572 connected to the remote control server 55 via the respective control communication networks and setting of the schedule/linked control function contained in the fixed agent 620 and describing the functions, such as behaviors, of those virtual machines, and including even records acquired through the virtual machines with the status monitoring/recording function contained in the fixed agent 610.

Further, based on the virtual machine including function of the fixed agent 630, the remote control server 65 can create, hold, operate and distribute an inclusive virtual machine including setting of the virtual machines 650a, 651a and 652a for the monitored/controlled target devices 56, 561 and 562 connected to the remote control server 65 via the respective control communication networks and setting of the schedule/linked control function contained in the fixed agent 630 and describing the functions, such as behaviors, of those virtual machines, and including even records acquired through the virtual machines with the status monitoring/recording function contained in the fixed agent 630.

In the above-described arrangement, the center server 51 having a collected data management function 511, an agent management function 512, a service information management function 513, a system management function 514, and a man-machine monitoring function 515 calls and holds an inclusive virtual machine 54Sc created by the fixed agent 610 in the remote control server 54. Likewise, the center server 51 calls and holds an inclusive virtual machine 55Sc created by the fixed agent 620 in the remote control server 55, and an inclusive virtual machine 65Sc created by the fixed agent 630 in the remote control server 65.

At this time, the inclusive virtual machine 54Sc held in the center server 51 always shares information in common with the virtual machines 56a, 561a and 562a in the remote control server 54, which are created by the fixed agent 610 in the remote control server 54 for the monitored/-controlled target devices 56, 561 and 562 connected to the remote control server 54 via the control communication networks 59, 591 and 592, respectively.

Similarly, the inclusive virtual machine 55Sc held in the center server 51 always shares information in common with the virtual machines 57a, 571a and 572a in the remote control server 55, which are created by the fixed agent 620 in the remote control server 55 for the monitored/-controlled target devices 57, 571 and 572 connected to the remote control server 55 via the control communication networks 60, 601 and 602, respectively.

Furthermore, the inclusive virtual machine 65Sc held in the center server 51 always shares information in common with the virtual machines 650a, 651a and 652a in the remote control server 65, which are created by the fixed agent 630 in the remote control server 65 for the monitored/-controlled target devices 650, 651 and 652 connected to the remote control server 65 via the control communication networks 604, 605 and 606, respectively.

The client terminal 52 also includes respective virtual machines in similar arrangement, and therefore a detailed description thereof is omitted here.

In addition, the remote control server 54 calls and holds an inclusive virtual machine 55Sb created by the fixed agent 620 in the remote control server 55, and an inclusive virtual machine 65Sb created by the fixed agent 630 in the remote control server 65.

Similarly, the remote control server 55 calls and holds an inclusive virtual machine 54Sb created by the fixed agent 610 in the remote control server 54, and an inclusive virtual machine 65Sm created by the fixed agent 630 in the remote control server 65. Moreover, the remote control server 65 calls and holds an inclusive virtual machine 54Sm created by the fixed agent 610 in the remote control server 54, and an inclusive virtual machine 55Sm created by the fixed agent 620 in the remote control server 55.

In the above arrangement, the inclusive virtual machine 55Sb held in the remote control server 54 and created by the fixed agent 620 in the remote control server 55 always shares information in common with the virtual machines 57a, 571a and 572a, which are held in the remote control server 55 for the monitored/controlled target devices 57, 571 and 572 connected to the remote control server 55 via the control communication networks 60, 601 and 602, respectively. Likewise, the inclusive virtual machine 65Sb held in the remote control server 54 and created by the fixed agent 630 in the remote control server 65 always shares information in common with the virtual machines 650a, 651a and 652a, which are held in the remote control server 65 for the monitored/-controlled target devices 650, 651 and 652 connected to the remote control server 65 via the control communication networks 604, 605 and 606, respectively.

Similarly, the inclusive virtual machine 54Sb held in the remote control server 55 always shares information in common with the virtual machines 56a, 561a and 562a for the monitored/controlled target devices 56, 561 and 562 connected to the remote control server 54 via the control communication networks 59, 591 and 592, respectively, and the inclusive virtual machine 65Sm held in the remote control server 55 always shares information in common with the virtual machines 650a, 651a and 652a for the monitored/controlled target devices 650, 651 and 652 connected to the remote control server 65 via the control communication networks 604, 605 and 606, respectively. In addition, the inclusive virtual machine 54Sm held in the remote control server 65 always shares information in common with the virtual machines 56a, 561a and 562a for the monitored/controlled target devices 56, 561 and 562 connected to the remote control server 54 via the control communication networks 59, 591 and 592, respectively, and the inclusive virtual machine 55Sm held in the remote control server 65 always shares information in common with the virtual machines 57a, 571a and 572a for the monitored/controlled target devices 60, 601 and 602 connected to the remote control server 55 via the control communication networks 60, 601 and 602, respectively.

Thus, the remote control servers 54, 55 and 65 connected to the center server 51 via the WAN and/or LAN 53 share information in common by utilizing the inclusive virtual machines that can be created, held, called and distributed by the remote control servers.

In the case of controlling the monitored/controlled target device 56 from the center server 51, by operating the inclusive virtual machine 54Sc held in the center server 51 and sharing information in common with the monitored/controlled target device 56, the information is rewritten because the inclusive virtual machine 54Sc always shares information in common with the virtual machine 56a for the monitored/-controlled target device 56 held in the remote control server 54, as described above. Upon rewriting of the information of the virtual machine 56a, the information of the monitored/controlled target device 56 is rewritten and controlled because the virtual machine 56a always shares information in common with the monitored/controlled target device 56. The control result is sent back to the center server 51 through a flow reversal to the above-described flow.

The above description is similarly applied to not only the cases of controlling the monitored/controlled target devices 561, 562, 57, 571, 572, 650, 651 and 652 from the center server 51 by using the inclusive virtual machines 54Sc, 55Sc and 65Sc, but also the cases of controlling the monitored/controlled target devices 56, 561, 562, 57, 571, 572, 650, 651 and 652, which are connected to the remote control servers 54, 55 and 56 via the respective control communication networks, from the client terminal 52 by using the inclusive virtual machines 54Sd, 55Sd and 65Sd. The control results are also sent back to the remote control servers from the center server and the client terminal.

A description is now made of the case of performing linked control between the monitored/controlled target devices 56 and 57 which are connected respectively to the remote control servers 54, 55 via the control communication networks 59, 60.

In this case, the remote control server 55 includes the fixed agent 620, which always resides therein and has the monitoring function inputted in advance so as to control the monitored/controlled target device 56 if there is an abnormality in the monitored/controlled target device 57.

When the remote control server 55 detects, e.g., an abnormality of the monitored/controlled target device 57 and controls the monitored/-controlled target device 56 as a linked target device, abnormal information of the monitored/controlled target device 57 is first detected by the remote control server 55 via the control communication network 60 through the input/output unit 61, whereupon the information of the virtual machine 57a for the monitored/controlled target device 57 is changed.

Upon a change in information of the virtual machine 57a for the monitored/controlled target device 57, the fixed agent 620 held in the remote control server 55 is started up and operates the inclusive virtual machine 54Sb, which is held in the remote control server 55 and always shares information in common with the virtual machine 56a for the monitored/controlled target device 56 held in the remote control server 54, for the purpose of operating the monitored/controlled target device 56 set as a linkage destination in advance. Upon a change in information of the inclusive virtual machine 54Sb held in the remote control server 55, the information of the virtual machine 56a is changed because the virtual machine 56a held in the remote control server 54 always shares information in common with the inclusive virtual machine 54Sb. Correspondingly, the monitored/controlled target device 56 is controlled because the virtual machine 56a always shares information in common with the monitored/controlled target device 56.

On the other hand, since the inclusive virtual machines 54Sc, 55Sc held in the center server 51 and the inclusive virtual machines 54Sd, 55Sd held in the client terminal 52 always respectively share information in common with the virtual machines 56a, 57a for the monitored/controlled target devices 56, 57 held in the remote control servers 54, 55, the result of the linked control is also reflected on the center server 51 and the client terminal 52.

Furthermore, the remote control server 54 can monitor and control the monitored/controlled target devices, which are connected to the server 54 via the respective control communication networks, in more flexible ways based on a comprehensive consideration by referring to record information and control setting information of the inclusive virtual machine 55Sb for the remote control server 55 and of the inclusive virtual machine 65Sb for the remote control server 65, which are called by and held in the server 54 itself. For example, when the remote control server 54 performs scheduled operation of a certain device, it is possible to control the scheduled operation with the fixed agent 610 always residing in the server 54 such that, when a current value of the relevant device connected to the server 54 via the control communication network exceeds a threshold and a total current value of the remote control servers 54, 55 and 65 also exceeds a threshold, the relevant device can be operated for the remaining time if those current values are each within a limit value, by referring to the inclusive virtual machines 55Sb, 65Sb called from the remote control servers 55, 65 and held in the server 54 and considering the operating time of each of the devices connected the remote control servers 55, 65 via the respective control communication networks.

Figure 12:
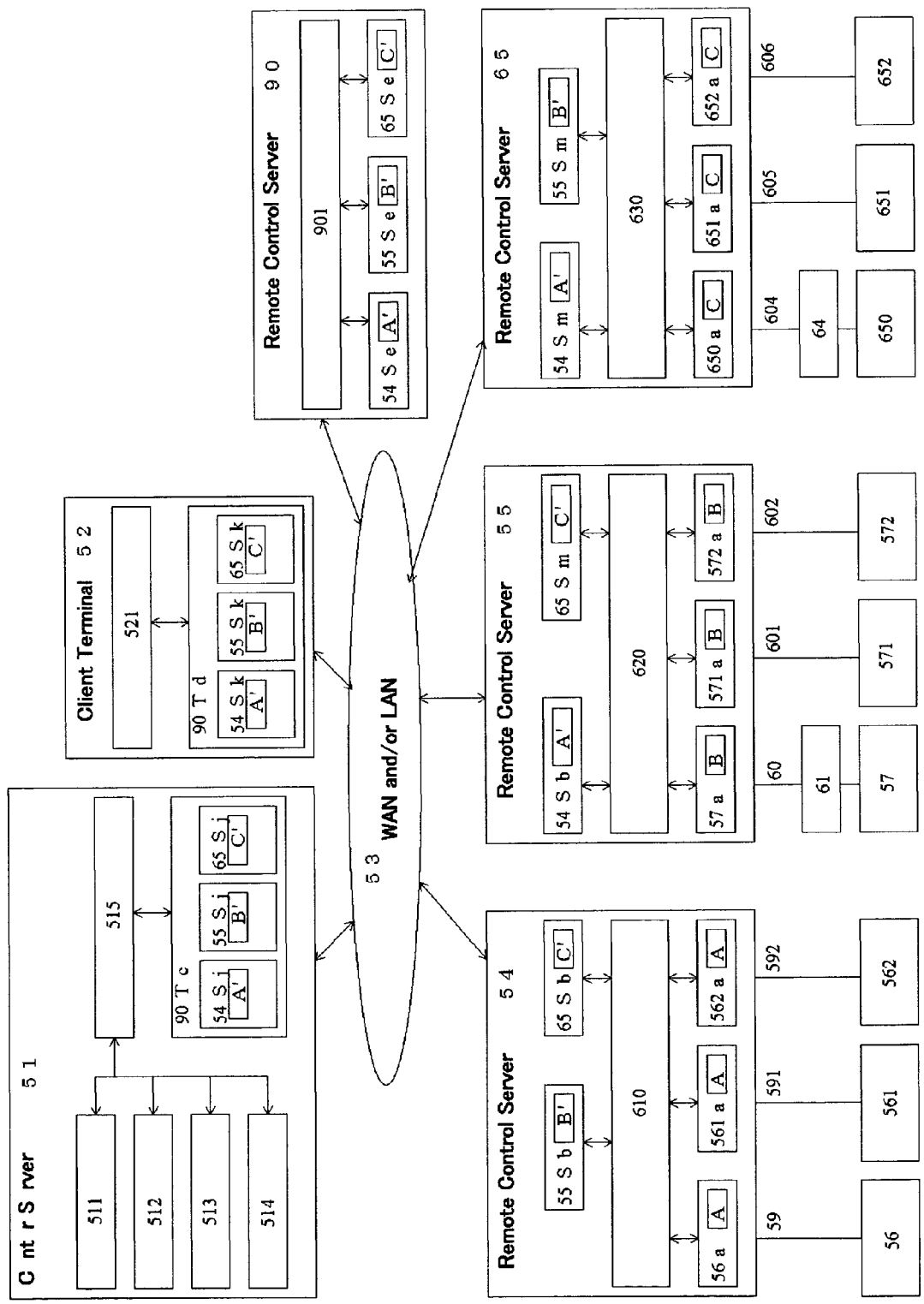
FIG. 12 is an explanatory view showing a state in which the remote control server 90 is connected via a WAN and/or LAN in the state of FIG. 7 for sharing information and performing monitoring/control and linked control by using the supervising virtual machine.

When the number of target devices to be monitored and controlled reaches the order of several tens thousands in practice, as shown, by way of example, in FIG. 12, a remote control server 90 is connected to the remote control servers 54, 55 and 65 via the WAN and/or LAN 53, and an inclusive virtual machine supervising function 901 for creating a supervising virtual machine to supervise inclusive virtual machines is prepared so as to always reside in the remote control server 90. With the virtual machine supervising function 901, the remote control server 90 creates a supervising virtual machine for supervising an inclusive virtual machine 54Se for the remote control server 54, an inclusive virtual machine 55Se for the remote control server 55, and an inclusive virtual machine 65Se for the remote control server 65, which are called by and held in the remote control server 90. The center server 51 and the client terminal 52 can efficiently share information in common with the monitored/controlled target devices 56, 561, 562, 57, 571, 572, 650, 651 and 652, and can quickly and smoothly control those monitored/-controlled target devices by calling, holding and operating supervising virtual machines 90Tc, 90Td created by the remote control server 90. The reason is as follows. For example, the supervising virtual machine 90Tc called by and held in the center server 51 shares information in common with the inclusive virtual machine 54Se called by and held in the remote control server 90 from the remote control server 54. Then, as described above, the inclusive virtual machine 54Sc shares information in common with the virtual machines 56a, 561a and 562a created by and held in the remote control servers 55. Those virtual machines share information in common with the monitored/controlled target devices 56, 561 and 562 connected to the remote control server 54 via the control communication networks 59, 591 and 592, respectively. The above description is similarly applied to the remote control servers 55, 65.

Further, a description is now made of the case of performing linked control between devices, in which, for example, the monitored/-controlled target device 56 connected to the remote control server 54 via the control communication network 59 and the monitored/controlled target device 57 connected to the remote control server 55 on the control communication network 60 through the input/output unit 61 are target devices of the linked control.

In this case, the setting to perform the linked control between which devices is previously inputted in the fixed agent residing in each of the remote control servers.

For example, when an abnormality occurs in the state of the monitored/controlled target device 57 connected to the remote control server 55 through the input/output unit 61, the information of the virtual machine 57a is changed which is held in the remote control server 55 and always shares information in common with the monitored/controlled target device 57. Upon a change in contents of the virtual machine 57a, the contents of the inclusive virtual machine 55Se, which is created by the remote control server 55 and is called by and held in the remote control server 90, is also changed because the inclusive virtual machine 55Se always shares information in common with the virtual machine 57a held in the remote control server 55.

Upon a change in contents of the inclusive virtual machine 55Se called by and held in the remote control server 90, the information of the inclusive virtual machine 55Sb, which is created by the remote control server 55 and is called by and held in the remote control server 54, is also changed because the inclusive virtual machine 55Sb always shares information in common with the inclusive virtual machine 55Se. In the remote control server 54, the fixed agent 610 is started up with a change in contents of the inclusive virtual machine 55Sb, and the information of the virtual machine 56a for the monitored/controlled target device 56, i.e., the target device of the linked control, is changed. Upon a change in contents of the virtual machine 56a, the monitored/controlled target device 56 is controlled because the monitored/controlled target device 56 always shares information in common with the virtual machine 56a.

Also, in the center server 51 and the client terminal 52, since the supervising virtual machine 90Tc created by the remote control server 90 and called by and held in the center server 51 and the supervising virtual machine 90Td created by the remote control server 90 and called by and held in the client terminal 52 share information in common with the inclusive virtual machine 55Se, the contents of the supervising virtual machines 90Tc, 90Td are also changed upon a change in contents of the inclusive virtual machine 55Se held in the remote control server 90.

For the contents of control made on the monitored/controlled target device 56, the control result is linked because the virtual machines, the inclusive virtual machines and the supervising virtual machines held in the remote control servers 54, 55, 65 and 90, the center server 51 and the client terminal 52 always share information in common with each other as described above.

Furthermore, the linked control between the other monitored/-controlled target devices can be performed through the remote control servers 54, 55 and 65 in a similar manner, and hence a detailed description is omitted here.

If the remote control server 90, for example, should be failed, it is possible to share information and perform the linked control between the remote control servers, and to ensure reliability of the system because each of the remote control servers calls and holds therein the inclusive virtual machines created by the other remote control servers.

INDUSTRIAL APPLICABILITY

The present invention has the industrial applicability as follows.

(1) A virtual machine, which is a software object described as the other self of a monitored/controlled target device in the center or the client having the same information as that possessed by the monitored/controlled target device, always shares the same information as that possessed by the monitored/controlled target device. Therefore, the center or the client can easily monitor and control the monitored/-controlled target device in a remote place by changing the virtual machine held by itself.

(2) Because the virtual machine can be utilized as a software part in development of software for realizing monitoring/control of the device, an advanced monitoring/control system can be constructed without knowledge regarding data communications and measurement control.

(3) Because change of the system, setting of various parameters, etc. can be performed via a network, the frequency of replacement of devices and the frequency at which engineers must actually go to sites are reduced. The maintenance cost is hence cut down.

(4) Because a control network and an information network can be seamlessly linked with each other and the virtual machines are installed using the network distributed object technique without position dependency, it is possible to monitor and control the devices by utilizing the agent technique.

(5) The number of the monitored/controlled target devices handled by the center server and the client terminal can be greatly increased, and the traffic amount among the many monitored/controlled target devices, the remote control servers, the center server, and the client terminal can be reduced. Consequently, efficient management, monitoring and control can be realized.

By mounting wireless public telephones such as cellular phones, for example, the server can establish the connection via wireless public lines even in a district where a wired public line network is not installed. Also, since the server has a serial port capable of switching over the connection to RS232C and allowing an external communication device to be attached to the port, it is possible to increase not only a variety of available means for communication with the outside, but also a variety of places in which the server can be installed.

(6) The server has a communication port for transferring control signals and data with respect to the monitored/controlled target device and the input/output unit, and can supply electric power to devices, etc. connected to the communication port. Accordingly, electrical wiring for the monitored/controlled target device can be facilitated.

(7) Communications can be realized via a wide area communication network using TCP/IP, for example. Therefore, when the center, etc. are located in remote districts, the communication charge can be reduced in comparison with the case of employing the public lines by utilizing the Internet. In addition, access to the remote control sever can be easily and inexpensively realized from every corners in the world.

(8) Data can be directly collected from the monitored/controlled target device.

(9) Because the server has a serial port dedicated for setting of functions and maintenance of the system, the setting of functions and the maintenance of the system can be performed with ease.

(10) With the provision of a backup circuit, the system can be restored to the status prior to power-down without losing data in the event of the power-down. Accordingly, continuity of monitored/controlled data, etc. can be protected as far as possible.

(11) When shutdown or the like is externally conducted through a software input switch, hardware can be brought into an end after ending the started-up application, etc. with safety.

(12) Because of employing the real-time operating system that is adopted in space ships as well, stable monitoring and control of devices can be performed and reliability of the overall system can be increased. Also, because of having the Java run environment, efficient system construction can be realized with a visual development environment based on the object oriented programming.

(13) The system can be constructed even in place or environment in which it has been impossible to install the system in the past, and hence can be applied in a wider region than a conventional system. Also, since the system can be operated from a mobile medium, the system management is no longer bound to a stationary place. In the event of an abnormality, a prompt action can be realized, for example, by urgently calling a maintenance person.

(14) It is possible to utilize database in the center server, the client terminal or an external system, and to handle and process data in an external system. As a result, the accuracy in data analysis can be improved.

(16) Because universal digital inputs can be handled with Java applications, a wider application region is realized.

(17) Because operating and abnormal conditions of the system can be stored, as log messages, in a nonvolatile memory, loss of data can be protected. Also, because a system alarm message, etc. are sent to a surveillant person via, e.g., E-mails, a prompt action can be achieved.

(18) Because monitoring and control can be performed by creating an agent so as to always reside therein, sole operation of the server can be realized and autonomous monitoring and control can be performed even when the client terminal or the other center goes down. Also, because there is no necessity of keeping the device connected to the communication at all times, the communication charge is cut down.

(19) The system can be operated to be more finely adaptable for user's needs, and efficient operation management of the overall system can be realized. Finer and more flexible monitoring and control can be performed while monitoring the status of each of the interconnected devices among the remote control servers, and considering records collected by the other remote control servers and control settings synthetically.

The invention claimed is:

1. A system for autonomous decentralized control, comprising:
   a client terminal;
   a center server;
   a remote control server;
   a network, the client terminal, the center server and the remote control server are connected through a WAN and/or LAN;
   a monitored/controlled target device having a memory and connected to the remote control server through a control communication network including a power line communication network; and
   a virtual machine, which is described as a duplication of the monitored/controlled target device and has the same information as that possessed by the memory of the monitored/controlled target device, and which is software objects having communication protocols used for performing control communication with the monitored/controlled target device on the control communication network and concealed in the software objects, wherein the virtual machine is movable in the system with transparency through rewriting of status information and control information of the monitored/controlled target device into the software object,
   wherein the virtual machine comprises a virtual machine software that operates the monitored/controlled target device and an interface software which is in pair to the virtual machine software, the interface software containing the communication protocols used for performing control communication with the monitored/controlled target device on the control communication network, and
   wherein the remote control server comprises a virtual machine management table for the monitored/controlled target device, a virtual machine software library for the monitored/controlled target device, and an interface software library for control communication of the monitored/controlled target device, and, in response to the client terminal or the center server accessing the remote control server and designating the virtual machine software, the remote control server distributes the virtual machine software to the client terminal or the center server and the virtual machine software on the client terminal or center server side is combined with the interface software which is in pair to the virtual machine software on the remote control server side to form the virtual machine.

2. A system according to claim 1, wherein said remote control server is able to perform at least one of creating, holding, distributing and operating the virtual machine.

3. A system according to claim 1, wherein said remote control server has functions capable of at least one of creating, holding, distributing and operating the virtual machine, and also has functions capable of at least one of calling, holding and operating a virtual machine created by another remote control server.

4. A system according to any one of claims 1, 2 and 3, wherein said remote control server comprises a fixed agent, which always resides therein and is inputted in advance so as to control the virtual machine.

5. A system according to claim 4, wherein said remote control server has functions capable of at least one of creating, holding, distributing and operating an inclusive virtual machine, the inclusive virtual machine having at least one of information of setting of a plurality of virtual machines, information of setting the fixed agent, and records acquired through each of the virtual machines, and
   said remote control server has functions capable of at least one of creating, holding, distributing and operating a supervising virtual machine for supervising a plurality of inclusive virtual machines.

6. A system according to claim 5, wherein said remote control server has functions capable of at least one of calling, holding and operating the inclusive virtual machine and the supervising virtual machine created by another remote control server.

7. A system according to claim 5, wherein said remote control server has a remote station system for causing the fixed agent to be distributed or to reside.

8. A system according to claim 5, wherein said center server is able to at least one of create, hold and operate the virtual machine, and to distribute the virtual machine and/or the fixed agent to one or more remote control servers,
   said center server being capable of at least one of creating, holding, distributing and operating the inclusive virtual machine,
   said center server being capable of at least one of creating, holding, distributing and operating the supervising virtual machine, and said center server being capable of at least one of calling, holding and operating the virtual machines, the inclusive virtual machines and the supervising virtual machines created by the remote control servers.

9. A system according to claim 8, wherein:

said remote control server having functions capable of at least one of calling, holding and operating the inclusive virtual machine and the supervising virtual machine created by another remote control server, wherein said remote control server is able to at least one of change information of each of the plurality of the monitored/controlled target devices and monitor and control each target device by operating the at least one of the virtual machines, the inclusive virtual machines and the supervising virtual machines, and said remote control server has a remote station system for causing the fixed agent to be distributed or to reside.

* * * * *